US008187822B2

(12) United States Patent
Brune et al.

(10) Patent No.: US 8,187,822 B2
(45) Date of Patent: May 29, 2012

(54) METHODS TO IDENTIFY MODULATORS

(75) Inventors: Nicole Erna Irene Brune, San Diego, CA (US); Jay Patrick Slack, Loveland, OH (US); Ioana Maria Ungureanu, Cincinnati, OH (US); Kimberley Gray, Loveland, OH (US); Christopher Todd Simons, Wyoming, OH (US); Jenny Ellen Evans Pennimpede, Cincinnati, OH (US)

(73) Assignee: Givaudan S.A. (CH)

( * ) Notice: Subject to any disclaimer, the term of this patent is extended or adjusted under 35 U.S.C. 154(b) by 30 days.

(21) Appl. No.: 12/593,155

(22) PCT Filed: Mar. 27, 2008

(86) PCT No.: PCT/CH2008/000134
§ 371 (c)(1),
(2), (4) Date: Sep. 25, 2009

(87) PCT Pub. No.: WO2008/119195
PCT Pub. Date: Oct. 9, 2008

(65) Prior Publication Data
US 2010/0129833 A1    May 27, 2010

Related U.S. Application Data

(60) Provisional application No. 60/909,143, filed on Mar. 30, 2007, provisional application No. 60/962,549, filed on Jul. 30, 2007.

(51) Int. Cl.
*G01N 33/567* (2006.01)
*C07K 14/705* (2006.01)
(52) U.S. Cl. .......... 435/7.2; 435/7.1; 435/7.21; 436/501
(58) Field of Classification Search .................. None
See application file for complete search history.

(56) References Cited

U.S. PATENT DOCUMENTS

| | | | |
|---|---|---|---|
| 5,919,649 | A | 7/1999 | Habener et al. |
| 7,105,650 | B2 | 9/2006 | Adler et al. |
| 7,579,453 | B2 | 8/2009 | Drayna et al. |
| 2002/0051997 | A1 | 5/2002 | Zucker et al. |
| 2002/0094551 | A1 | 7/2002 | Adler et al. |
| 2003/0022778 | A1 | 1/2003 | Zucker et al. |
| 2003/0054448 | A1 | 3/2003 | Adler et al. |
| 2003/0157568 | A1 | 8/2003 | Zucker et al. |
| 2004/0038312 | A1 | 2/2004 | Zucker et al. |
| 2004/0209286 | A1 | 10/2004 | Adler et al. |
| 2004/0209313 | A1 | 10/2004 | Adler et al. |
| 2004/0248149 | A1 | 12/2004 | Adler et al. |
| 2005/0032158 | A1 | 2/2005 | Adler et al. |
| 2005/0069944 | A1 | 3/2005 | Adler et al. |
| 2007/0292944 | A1 | 12/2007 | Adler et al. |

FOREIGN PATENT DOCUMENTS

| | | |
|---|---|---|
| WO | WO 01/18050 A2 | 3/2001 |
| WO | WO 2004/029087 A2 | 4/2004 |
| WO | WO 2004/055048 A2 | 7/2004 |
| WO | WO 2004/069191 A2 | 8/2004 |
| WO | WO 2005/007891 A2 | 1/2005 |
| WO | WO 2006/053771 A2 | 5/2006 |

OTHER PUBLICATIONS

Behrens, Maik, et al., "Members of RTP and REEP gene families influence functional bitter raste receptor expression", Journal of Biological Chemistry, Jul. 2006, pp. 20650-20659, vol. 281, No. 29, XP002494217.

Behrens, Maik, et al., "Bitter taste receptors and human bitter taste perception", Cellular and Molecular Life. Sciences, May 29, 2006, pp. 1501-1509, vol. 63, XP002494219.

Broach, J.R. and J. Thorner "High-throughout screening for drug discovery", (1996) Nature 384 (supp.) 14-16).

Bufe, Bernd et al., "The human TAS2R16 receptor mediates bitter taste in reponse to beta- glucopranoside", Naturte Genetics, Nov. 1, 2002. pp. 397-401, vol.32, No. 3, Nature Publishing Group, New York, XP002269573.

Felley-Bosco et al., "Constitutive Expression of Inducible Nitric Oxide Synthase in Human Bronchial Epithelial Cells Induces c-*fos* and Stimulates the cGMP Pathway" Am. J. Resp. Cell and mol. Biol., (1994) 11:159-164.

Gijon et al., "Cytosolic Phospholipase $A_2$ is Required for Macrophage Arachidonic Acid Release by Agonists That Do and Do Not Mobilize Calcium" 2000, J.Biol. Chem., 275:20146-20156.

Hafner, "Cytosensor Mircrophysiometer: technology and recent applications", Biosens. Bioelectron. 15: 149-158.

Horton & Baxendale, "Mass Measurements of Cyclic AMP Formation by Radioimmunoassay. Enzyme Immunoassay and Scintillation Proximity Assay" 1995, Methods Mol. Biol. 41: Chap. 8, 91-105.

Kenimer & Nirenberg, "Desensitization of Adenylate Cyclase to Prostaglandin $E^1$ or 2-Chloroadenosine" 1981, Mol. Pharmacol. 20: 585-591.

Kikkawa et al., 1982, "Calcium-activated, Phospholipid-dependent Protein Kinase from Rat Brain": Journal of Biological Chemistry; 257: 13341.

Kim, Unkyung, et al., "Worldwidee haplotype diversity and coding sequence variation at human bitter teste receptor loce", Human Mutation, Sep. 2005, pp. 199-204, vol. 26. No. 3, XP008095937.

Knight and Grigliatti, "Chimeric G Proteins Extend the Range of Insect Cell-Based Functional Assays for Human G Protein-Coupled Receptors"(2004) Journal of Receptors and Signal Transduction 24: 241-256.

Kuhn, Christina, et al., "Bitter taste receptors for saccharin and acesulfame K", Journal of Neuroscience. Nov. 10. 2004, pp. 10260-10265, vol. 24, No. 45, XP002494218.

Pinna & Ruzzene, "How do protein kinases recognize their substrates?" 1996, Biochem, Biophys. Acta 1314: 191-225.

Shamil, S. et al., "Physico-chemical and psychophysical studies of 4 1' 6' trichloro-4 1' 6'-trideoxygalactosucrose sucralose", Lebensmittel Wissenschaft Und Technologie, Jan. 1, 1992, vol. 25, No. 2, Academic Press, London, XP008095932.

(Continued)

*Primary Examiner* — John Ulm
(74) *Attorney, Agent, or Firm* — Curatolo Sidoti Co., LPA; Joseph G. Curatolo; Salvatore A. Sidoti

(57) ABSTRACT

Sucralose-binding TAS2R bitter taste receptors have been identified. Novel methods to identify modulators and in particular inhibitors to the bitter taste of sucralose, and an inhibitor, are provided.

13 Claims, No Drawings

OTHER PUBLICATIONS

Traynor and Nahorski, "Modulation by μ-Opioid Agonists of Guanosine-5'-O-(3-[$^{35}$S]thio)triphosphate Binding to Membranes from Human Neuroblastoma SH-SY5Y Cells" 1995. Mol. Pharmacol. 47: 848-854.

Database GENESEQ, "Taste receptor modulation-human T2R64 gene sequence SeqID182". Nov. 4, 2004, XP002494220.

Database EMBL, "Sequence 36 from patent US 6558910", Jun. 13, 2003, XP002494221.

Database EMBL, "Sequence 36 from patent US 5558910", Jun. 13, 2003, XP002494222.

Database GENESEQ, "Human bitter taste receptor haplotype protein T2R44 Seq 196", Apr. 7, 2005, XP002494224.

Database EPO Proteins. "Sequence 25 from Patent WO2004029087", Apr. 28, 2004, XP00249225.

Database GENESEQ, "Human bitter taste receptor haplotype protein T2R44 Seq 196", Apr. 7, 2005, XP002494226.

Database Geneseq, "Taste receptor type 2 member T2R16/TAS2R16 encoding DNA", Mar. 9, 2006, XP002494227.

PCT/CH2008/000134—Written Opinion of the International Search Report Authority, Sep. 15, 2008.

PCT/CH2008/000134—International Search Report, Sep. 15, 2008.

METHODS TO IDENTIFY MODULATORS

Provided are methods to identify modulators of the bitter aftertaste associated with sucralose.

Sucralose is a sweetener that provides a bitter off-note/aftertaste, and thereby limits the use of sucralose in food. Therefore, methods that are able to identify compounds or ingredients that are able to modulate, and in particular to inhibit or mask, this bitter aftertaste are of interest.

Bitter taste is perceived via taste receptors, and a family of 25 functional bitter taste receptors (TAS2R or T2R) is known. None of these receptors had previously been shown to be activated by sucralose.

Applicant found that four of these receptors are activated by sucralose.

In particular, applicant identified sucralose as a specific agonist of taste receptor type 2 member 44 (TAS2R44), member 1 (TAS2R1), member 10 (TAS2R10), and member 46 (TAS2R46). These four receptors are referred to herein below as "sucralose activated bitter taste receptors" or "SABTR".

This finding allows to provide methods that employ the identified SABTR and their agonist sucralose to identify ingredients that modulate the response of a SABTR to sucralose, for example, antagonists (blockers, inhibitors or masking agents) of the sucralose-dependent SABTR activation. The methods therefore allow to identify modulators including bitter masking agents for sucralose, as was demonstrated for (E)-4-(2,2,3-trimethylcyclopent-3-enyl)but-2-enoic acid, which was shown to inhibit the response of a SABTR to sucralose, and to significantly reduce the bitter aftertaste of sucralose in human sensory evaluations.

SUMMARY

Provided is the following:

(1) A method to identify an agent that modulates the taste of sucralose, the method comprising:
(i) contacting cells that express a TAS2R bitter taste receptor that is able to be activated by sucralose with sucralose in the presence of at least one agent; and
(ii) determining whether the at least one agent affects binding to sucralose or a functional response thereto of said TAS2R bitter taste receptor,
with the proviso that the cells are not unmanipulated cells in their natural environment.

(2) The method as described herein, including under (1), wherein the TAS2R bitter taste receptor comprises one or more sequences selected from
a TAS2R bitter taste receptor substantially homologous to a polypeptide sequence selected from the group consisting of SEQ ID NO:2, SEQ ID NO:4, SEQ ID NO:6, and SEQ ID NO:8, with a sequence identity of at least 90%;
a TAS2R bitter taste receptor which is encoded by a nucleotide sequence selected from the group consisting of
a nucleic acid substantially homologous to a nucleotide sequence selected from the group consisting of SEQ ID NO:1, SEQ ID NO:3 and SEQ ID NO:5, SEQ ID NO:7, as determined by sequence identity,
a nucleic acid substantially homologous to a nucleotide sequence selected from the group consisting of SEQ ID NO:1, SEQ ID NO:3 and SEQ ID NO:5, SEQ ID NO:7, as determined by hybridisation,
wherein the substantially homologous nucleic acid as determined by sequence identity has a sequence identity of at least 90%;
wherein the substantially homologous nucleic acid as determined by hybridisation hybridises under stringent hybridization conditions at a temperature of 42° C. in a solution consisting of 50% formamide, 5×SSC, and 1% SDS, and washing at 65° C. in a solution consisting of 0.2×SSC and 0.1% SDS;
wherein the nucleic acid optionally comprises SEQ ID NO:12 (HSV tag) at or near its end to form the C-terminus in the corresponding protein, and optionally comprises a membrane export tag, optionally selected from rat somatostatin (RSS) and rhodopsin, optionally selected from SEQ ID NO:11 (RSS tag), at or near its end to form the N terminus,
and wherein the TAS2R bitter taste receptor polypeptide sequence optionally comprises SEQ ID NO:12 (HSV tag) at or near its end to form the C-terminus, and optionally comprises a membrane-export tag, optionally selected from rat somatostatin (RSS) tag and rhodopsin tag, optionally selected from SEQ ID NO:11 (RSS), at or near its end to form the N terminus.

(3) The method as described herein including under (1) and (2) wherein the TAS2R bitter taste receptor comprises a conservative functional variant able to be activated by sucralose.

(4) The method as described herein including under (1), (2) or (3) wherein the cells also express a G-Protein, optionally a chimeric G-protein substantially homologous to Gaq-Gustducin, or substantially homologous to the chimeric G-protein G alpha 16-gustducin 44.

(5) The method as described herein, including under (1) to (4), wherein step (ii) comprises measuring a change in or caused by intracellular messengers.

(6) The method as described herein, including under (1) to (5), determining the functional response by measuring a change in an intracellular messenger selected from IP3 and calcium$^{2+}$.

(7) The method as described herein, including under (1) to (6), wherein said cells are selected from the group consisting of bacterial cells, eucaryotic cells, yeast cells, insect cells, mammalian cells, amphibian cells, worm cells and combinations thereof.

(8) The method as described herein, including under (7), wherein the cell comprises a mammalian cell.

(9) The method as described herein, including under (8), wherein the cell comprises a mammalian cell selected from the group consisting of CHO, COS, HeLa, HEK-293 cells and combinations thereof.

(10) The method as described herein, including under (1) to (9) wherein step (i) further comprises contacting the TAS2R bitter taste receptor with a test agent in presence of calcium, optionally in the form of calcium chloride.

(11) A kit comprising:
(i) recombinant cells that express a TAS2R bitter taste receptor as defined herein, including under (1) to (3), and
(ii) sucralose,
for combined use to identify test agents that modulate the taste of sucralose.

(12) A method of using the kit described herein, including under (11), comprising:
(i) growing recombinant cells that express a TAS2R bitter taste receptor as described herein, including under (1) to (3),
(ii) adding test agents in the presence of sucralose in a suitable concentration, and
(iii) determining a change in a parameter that changes in response to sucralose binding to the TAS2R bitter taste receptor or a functional response of the cells by comparing the parameter or functional response in presence and absence of the test agent, to identify test agents that modulate the taste of sucralose.

(13) A method to identify an agent that modulates the TAS2R bitter taste receptor as defined herein, including under (1) to (3), the method comprising:
(i) measuring a parameter that changes in response to sucralose binding to the TAS2R bitter taste receptor or a functional response, and
(ii) determining a change of the parameter in response to a test agent, in comparison to a negative control and thereby identifying a modulator of the taste of sucralose.

(14) A method as described herein, including under (13), wherein step (i) is performed by a method selected from the group consisting of fluorescence spectroscopy, NMR (nuclear magnetic resonance) spectroscopy, measuring of one or more of absorbance, refractive index, hydrodynamic methods, chromatography, measuring solubility, biochemical methods, wherein the methods measure the properties of the TAS2R bitter taste receptor in a suitable environment selected form the group consisting of solution, bilayer membrane, attached to a solid phase, in a lipid monolayer, bound on a membrane, and in vesicles.

DETAILED DESCRIPTION

The methods provided herein permit the identification of test agents that increase or decrease the effect of sucralose on a SABTR (modulators). The methods may be in vivo or in vitro. Cells expressing a SABTR optionally with a G-protein, are contacted with test agents in combination sucrose to determine the properties of said agents as sucralose taste modulators, including but not limited to sucralose bitterness blockers.

The effects of the test agents upon a SABTR can be measured by examining any suitable parameters of SABTR binding, or an activated SABTRs functional response. Any suitable assay detecting TAS2R receptor activity can be used.

Receptor activation typically initiates subsequent intracellular events, for example, increases in second messengers, for example, IP3, which releases intracellular stores of calcium ions. Activation of some G-protein coupled receptors stimulates the formation of inositol triphosphate (IP3) through phospholipase C-mediated hydrolysis of phosphatidylinositol. IP3 in turn stimulates the release of intracellular calcium ion stores. Thus, a change in cytoplasmic calcium ion levels, or a change in second messenger levels such as IP3 can be used to determine G-protein coupled receptor activity.

The functional effects of the agent on the receptor and/or G-protein are determined by any suitable functional assay, for example, an assay that measures changes in parameters of the transduction pathways such as intracellular $IP_3$ and $Ca^{2+}$, or by other G-protein specific assays such as labeling with GTPγS, according to techniques known in the art. Alternatively, binding assays may be used to determine the effect on sucralose binding to a SABTR. The identified agent can then be further tested for its activity as a sucralose modulator according to techniques known in the art, described without limitation herein below.

A functional response that can be used to identify a modulator comprises any physiological change that is affected by SABTR activity; a variety of such changes are determined in different functional assays.

Such functional assays are well-known in the art, for example, without limitation, assays that use recombinant cells or intact cells or tissues isolated from animals and that are based on measuring the concentration, activity, or change of a secondary messenger (including, for example, intracellular calcium (Ca2+), cAMP, cGMP, inositol phospate (IP3), diacylglycerol/DAG, arachinoid acid, MAP kinase or tyrosine kinase), ion flux, phosphorylation levels, transcription levels, neurotransmitter levels, and assays based on GTP-binding, GTPase, adenylate cyclase, phospholipid-breakdown, diacylglycerol, inositol triphosphate, arachidonic acid release, PKC, kinase and transcriptional reporters. Some suitable assays are, for example, described in WO 01/18050. Various functional assays are exemplified herein-below; example 3 describes a fluorescent assay that detects calcium.

Receptor activation typically initiates subsequent intracellular events, for example, increases in second messengers, for example, $IP_3$, which releases intracellular stores of calcium ions. Activation of some G-protein coupled receptors stimulates the formation of inositol triphosphate ($IP_3$) through phospholipase C-mediated hydrolysis of phosphatidylinositol. $IP_3$ in turn stimulates the release of intracellular calcium ion stores. Thus, a change in cytoplasmic calcium ion levels, or a change in second messenger levels such as $IP_3$ can be used to determine G-protein coupled receptor activity. All functional assays may be performed with, for example, samples containing cells expressing the receptor on their surfaces or on isolated cell membrane fractions. Useful cells are described in more detail herein-below. Also, for example, tissues from transgenic animals may be used.

To identify a modulator (which is not an agonist itself, e.g. an antagonist, inhibitor, or enhancer), samples with and without test agent both containing sucralose (agonist) are compared.

For example, a control (with sucralose but without modulator) is assigned a relative receptor activity value of 100. A decrease in activity relative to the control identifies an inhibitor, or antagonist, whereas an increase identifies an enhancer. An increase or decrease in the measured activity of, for example, 10% or more (or any statistically significant difference) can be considered significant in a sample with test agent compared to a sample without test agent; or in a sample with test agent compared to a control sample with test agent but in which the cells do not express a SABTR (mock-transfected cells).

To identify antagonists, SABTR activity in the presence of the agonist sucralose with and without a test agent is compared. Antagonists show a reduction of agonist-stimulated receptor activity, for example by at least 10%.

In addition to the functional assays described herein that measure a change in parameters caused by a functional response to agonist binding, changes in agonist binding itself can be determined by binding assays that measure the effects on the binding of sucralose to a SABTR. Binding assays are well known in the art and can be tested in solution, in a bilayer membrane, optionally attached to a solid phase, in a lipid monolayer, or in vesicles. Changes in binding of sucralose to a SABTR polypeptide can be determined by measuring parameters including but not limited to spectroscopic characteristics (for example fluorescence, absorbance, or refractive index), hydrodynamic methods (employing for example shape), and chromatography, measuring solubility properties of a SABTR polypeptide. In one embodiment, binding assays are biochemical and use membrane extracts from cells/tissue expressing recombinant SABTR polypeptides. A binding assay may, for example, be performed as described for T1Rs by Adler et al. in US20050032158, paragraphs [0169] to [0198].

Without limitation, various examples of suitable detection methods that measure SABTR receptor activity in assays follow herein below.

Cells Used in the Assays:

All functional assays may be performed by samples containing cells expressing the receptor on their surfaces or on isolated cell membrane fractions. Useful cells are described herein-above. Instead of samples with separate cells or cell membranes, tissues from transgenic animals may be used.

Isolated cells or tissues naturally expressing a SABTR can be used in the methods described herein. Alternatively a SABTR can be expressed using stable or transient expression systems. The generation of a stable cell line is well known, an example is described in example 2 herein. Alternatively, cells transiently expressing a SABTR can be used, for example, HEK293T/Gα16-gustducin 44 cells transiently expressing a SABTR.

Suitable eucaryotic cells include, for example, without limitation, mammalian cells, yeast cells, or insect cells (including Sf9), amphibian cells (including melanophore cells), or worm cells including cells of *Caenorhabditis* (including *Caenorhabditis elegans*). Suitable mammalian cells include, for example, without limitation, COS cells (including Cos-1 and Cos-7), CHO cells, HEK293 cells, HEK293T cells, HEK293 T-Rex™ cells, or other transfectable eucaryotic cell lines.

Suitable bacterial cells include without limitation *E. coli*.

Cells may be transfected with a SABTR and a G-protein (which links the SABTR to a phospholipase C signal transduction pathway) transiently or stably, as is well known in the art. An excellent heterologous expression system that employs the chimeric G-protein G alpha 16-gustducin 44 (also known as G.sub.alpha.16 gust(ducin)44, G.sub.alpha.16gust(ducin)44, Gα16gust(ducin)44, Gα16-gustducin 44, or as used hereinbelow, "G16gust44") which provides for enhanced coupling to taste GPCRs, is described in detail in WO 2004/055048. Alternatively, other chimeric G-proteins based on Gaq-Gustducin described in WO 2004/055048, or other G-Proteins, for example, G16 or G15, may also be used.

The SABTR can be expressed in a cell with a G-protein that links the receptor to a signal transduction pathway, for example, the phospholipase C signal transduction pathway, or signal transduction pathways including, for example, the following: adenylate cyclase, guanylate cyclase, phospholipase C, IP3, GTPase/GTP binding, arachinoid acid, cAMP/cGMP, DAG, protein kinase c (PKC), MAP kinase tyrosine kinase, or ERK kinase.

Alternatively, any suitable reporter gene may be linked to a SABTR-activation responsive promoter and used to determine SABTR activity, as described in more detail hereinbelow.

Vector Constructs Used in Cells Described Herein-Above:

Any suitable expression vector may be used, for example, a plasmid vector with expression cassette. For example, pcDNA3.1Zeo or pcDNA5/FRT (Invitrogen, Carlsbad, Calif., US).

For transient expression, any suitable vector can be used, for example, pcDNA5/FRT provides useful results.

SABTR constructs may include so-called tags, including but not limited to a membrane export tag and a tag used for detection of the SABTR including but not limited to immuno detection.

By "membrane export tag" is meant a nucleotide or peptide signal sequence to form the N-terminal part of a protein and to cause the protein to be exported to the membrane. In transformed cells it ensures that the introduced membrane protein (TAS2R bitter taste receptor) translated from the transfected nucleotide sequence is properly targeted to the membrane. Any of the known membrane export tags can be used, for example, without limitation, a membrane export tag from somatostatin, for example, without limitation, rat somatostatin (RSS, SEQ ID NO:11, to form a peptide of 45 amino acids), a rhodopsin tag/fragment, for example, without limitation, bovine rhodopsin, for example, without limitation, the 39 N-terminal aa of rhodopsin or bovine rhodopsin (see for example in Krautwurst et al. 1998, Cell 95(7):917-26), or the relevant fragment from another membrane protein, for example, without limitation, about 7 to about 100 N-terminal aminoacids of a membrane protein.

The HSV tag can be used for immuno detection, or alternatively, it can be replaced by another immuno detection tag or, if no immuno detection is to be performed, it can be left out. Alternative tags for immuno detection are, for example, FLAG® tag (Sigma), HA tag, c-MYC tag, HIS tag, HSV tag, VSV-G tag, V5 tag and others.

The vector constructs for expressing the GPCR and/or the G-protein in such cells may be produced in a manner known per se using Polymerase Chain Reactions. After verfication of the sequence, cDNA fragments may be sub-cloned into a suitable vector, for example pcDNA 3.1 mammalian expression vector for mammalian cells, and transiently transfected in a corresponding host cell to enable the correct expression of the gene.

After a post-transfection period, for example 48 hours, cell lysates may be prepared, analysed by a Western-Blot analysis in order to confirm the correct expression of the protein. Once correct protein expression is confirmed, suitable cells, for example mammalian cells including HEK293T cells and HEK T-Rex™, may be transfected to generate cells stably expressing the protein according to techniques well known in the art.

Alternatively, a variety of non-mammalian expression vector/host systems can be used to contain and express sequences encoding the SABTR G-Protein coupled receptor (GPCR). These include, for example, microorganisms including bacteria transformed with recombinant bacteriophage, plasmid, or cosmid DNA expression vectors; yeast transformed with yeast expression vectors; insect cell systems infected with viral expression vectors (for example baculovirus), or with bacterial expression vectors (for example pBR322 plasmids).

Examples of specific vectors that may be used with the systems described herein-above are described in "G-protein coupled receptors (Signal Transduction Series)"; Editors: Tatsuya Haga and Gabriel Berstein, 1st ed., CRC Press—Boca Raton Fla.; September 1999.

In bacterial systems, a number of cloning and expression vectors may be selected depending upon the use intended for polynucleotide sequences encoding the GPCR. For example, routine cloning, subcloning, and propagation of polynucleotide sequences encoding a GPCR can be achieved using a multifunctional *E. coli* vector such as pBLUESCRIPT (Stratagene, La Jolla Calif.) or pSPORT1 plasmid (Life Technologies). Ligation of sequences encoding a GPCR into the vector's multiple cloning site disrupts the lacZ gene, allowing a colorimetric screening procedure for identification of transformed bacteria containing recombinant molecules. In addition, these vectors may be useful for in vitro transcription, dideoxy sequencing, single strand rescue with helper phage, and creation of nested deletions in the cloned sequence. When large quantities of a GPCR are needed, for example, for the production of antibodies, vectors which direct high level expression of a GPCR may be used. For example, vectors containing the strong, inducible SP6 or T7 bacteriophage promoter may be used.

Yeast expression systems may be used for production of a GPCR. A number of vectors containing constitutive or inducible promoters, such as alpha factor, alcohol oxidase, and PGH promoters, may be used in the yeast *Saccharomyces cerevisiae* or *Pichia pastoris*. In addition, such vectors direct either the secretion or intracellular retention of expressed proteins and enable integration of foreign sequences into the host genome for stable propagation.

For the expression of heterologous proteins in insect cell lines is, for example, derivatives of the Lepidopteran baculovirus, *Autographa californica* multicapsid nucleo-virus (AcMNPV) can be used. In this system, foreign gene expression is directed by a very strong late viral promoter, either the polyhedrin or p10 promoters, and a wide array of vectors is available that optimises expression and recovery of recombinant proteins. These vectors enable expression of both membrane-bound and secreted proteins at high levels, and also many post-translational modifications known to occur in mammalian systems, including N- and O-linked glycosylation, phosphorylation, acylation, proteolysis and secreted vaccine components. A number of vectors are commercially available, for example the InsectSelect™ System from Invitrogen.

Expression Systems:

In order to express cDNAs encoding the desired proteins (GPCR (SABTR) and G-protein), one typically subclones the appropriate cDNA into an expression vector that contains a strong promoter to direct transcription, a transcription/translation terminator, and a ribosome-binding site for translational initiation. Suitable bacterial promoters are well known in the art, for example, *E. coli, Bacillus* sp., and *Salmonella*, and kits for such expression systems are commercially available. Similarly, eukaryotic expression systems for mammalian cells, yeast, and insect cells are commercially available. The eukaryotic expression vector may be, for example, an adenoviral vector, an adeno-associated vector, or a retroviral vector.

In addition to the promoter, the expression vector typically contains a transcription unit or expression cassette that contains all the additional elements required for the expression of the protein-encoding nucleic acid in host cells. A typical expression cassette thus contains a promoter operably linked to the nucleic acid sequence encoding the protein and signals required for efficient polyadenylation of the transcript, ribosome binding sites, and translation termination. The nucleic acid sequence encoding the protein may typically be linked to a membrane-targeting signal such as the N-terminal 45 amino acids of the rat Somatostatin-3 receptor sequence to promote efficient cell-surface expression of the recombinant protein, which is useful for cell-surface receptors. Additional elements may include, for example, enhancers.

An expression cassette should also contain a transcription termination region downstream of the structural gene to provide for efficient termination. The termination region may be obtained from the same gene as the promoter sequence or may be obtained from different genes.

For expression of the proteins, conventional vectors for expression in eucaryotic or procaryotic cells well known in the art may be used. Examples of vectors include bacterial expression vectors, for example, plasmids including pBR322-based plasmids, pSKF, and pET23D, and fusion expression systems, for example, GST and LacZ. Expression vectors containing regulatory elements from eukaryotic viruses are typically used in eukaryotic expression vectors, for example SV40 vectors, cytomegalovirus vectors, papilloma virus vectors, and vectors derived from Epstein-Barr virus. Other exemplary eukaryotic vectors include pMSG, pAV009/A+, pMTO10/A+, pMAMneo-5, baculovirus pDSVE, pcDNA3.1, pIRES and any other vector allowing expression of proteins under the direction of the SV40 early promoter, SV40 later promoter, metallothionein promoter, murine mammary tumor virus promoter, Rous sarcoma virus promoter, polyhedrin promoter, or other promoters shown effective for expression in eukaryotic cells.

Some expression systems have markers that provide gene amplification such as thymidine kinase, hygromycin B phosphotransferase, dihydrofolate reductase and the like.

The elements that are typically included in expression vectors may also include a replicon that functions in *E. coli*, a gene encoding drug resistance to permit selection of bacteria that harbor recombinant plasmids, and unique restriction sites in non-essential regions of the plasmid to allow insertion of eukaryotic sequences. The particular drug resistance gene chosen is not critical, any of the many drug resistance genes known in the art are suitable. The prokaryotic sequences are optionally chosen such that they do not interfere with the replication of the DNA in eukaryotic cells, if necessary.

In bacterial systems the GPCR cDNA fragment may be expressed alone or as a fusion protein wherein the GPCR of interest is fused to the *E. coli* periplasmic maltose-binding protein (MBP) wherein the MBP, including its signal peptide, is linked to the amino terminus of the GPCR. The wild-type GPCR cDNA or the MBP:GPCR fusion cDNA is subcloned into a suitable plasmid, for example pBR322, where in *E. coli*, GPCR expression is driven by the lac wild-type promoter. Methods of expression of GPCRs in *E. coli* are described, for example, in "G-protein coupled receptors (Signal Transduction Series)"; Editors: Tatsuya Haga and Gabriel Berstein, 1st ed., pp. 265-280 CRC Press—Boca Raton Fla.; September 1999.

Genetically engineered yeast systems and insect cell systems which lack endogenous GPCRs provide the advantage of a null background for SABTR screening.

Genetically engineered yeast systems substitute a human GPCR and Ga protein for the corresponding components of the endogenous yeast pheromone receptor pathway. Downstream signaling pathways are also modified so that the normal yeast response to the signal is converted to positive growth on selective media or to reporter gene expression (described by Broach, J. R. and J. Thorner (1996) Nature 384 (supp.):14-16).

Genetically engineered insect systems incorporate a human GPCR and Ga protein that enables receptor coupling the phospholipase C signaling pathway (see for example Knight and Grigliatti, (2004) J Receptors and Signal Transduction 24: 241-256). Amphibian cell systems, in particular melanophore cells, are described, for example, in WO 92/01810 that describes a GPCR expression system.

Overexpression of SABTR:

SABTR may be overexpressed by placing it under the control of a strong constitutive promoter, for example the CMV early promoter. Alternatively, certain mutations of conserved GPCR amino acids or amino acid domains can be introduced to render the employed SABTR GPCR constitutively active.

Transfection of SABTR Expression Vector Constructs into Cells:

Standard transfection methods can be used to produce bacterial, mammalian, yeast or insect cell lines that express large quantities of the protein.

Any known method for introducing nucleotide sequences into host cells may be used. It is only necessary that the particular genetic engineering procedure used be capable of successfully introducing the relevant genes into the host cell capable of expressing the proteins of interest. These methods may involve introducing cloned genomic DNA, cDNA, synthetic DNA or other foreign genetic material into a host cell and include the use of calcium phosphate transfection, polybrene, protoplast fusion, electroporation, liposomes, microinjection, plasma vectors, viral vectors and the like.

For example, without limitation, the T-Rex™ expression system (Invitrogen Corp., Carlsbad, Calif.) may be used. The T-Rex™ System is a tetracycline-regulated mammalian expression system that uses regulatory elements from the *E. coli* Tn10-encoded tetracycline (Tet) resistance operon. Tetracycline regulation in the T-Rex™ System is based on the binding of tetracycline to the Tet repressor and derepression of the promoter controlling expression of the gene of interest.

Cell Culture:

After transfection, the transfected cells may be cultured using standard culturing conditions well known in the art. It will be apparent to the skilled person that different cells require different culture conditions including appropriate temperature and cell culture media.

SABTR Receptor Protein Recovery:

If desired, the protein may be recovered from the cell culture using standard techniques. For example, the cells may be burst open either mechanically or by osmotic shock before being subject to precipitation and chromatography steps, the nature and sequence of which will depend on the particular recombinant material to be recovered. Alternatively, the recombinant protein may be recovered from the culture medium in which the recombinant cells had been cultured.

Modulators that May be Identified by the Assays:

Modulators (for example, inhibitors, enhancers, and antagonists, but not agonists) of SABTR receptor activity can be identified as described herein below.

The type of a modulator may include more than one type at a time, and may depend on the concentration. For example, an agent may act as an agonist in a certain concentration range, but act as a modulator or enhancer of another agonist (for example a sweetener or sugar) in another concentration range. Therefore, agents should be tested at different concentrations to identify them as modulators.

There now follows a definition of the agents to be identified in the methods described herein.

A modulator as used herein is an agent that effects an increase or decrease of one or more of the following: the cell surface expression of a receptor, the binding of an agonist (sucralose) to a receptor, the intracellular response initiated by an active form of the receptor (in the presence of sucralose), or another physiological response.

The modulator modulates (increases or decreases) the response of a SABTR to sucralose.

Modulators include various types of compounds, including small molecules, peptides, proteins, nucleic acids, antibodies or fragments thereof. These can be derived from various sources including synthetic or natural, extracts of natural material, for example from animal, mammalian, insect, plant, bacterial or fungal cell material or cultured cells, or conditioned medium of such cells.

Sucralose is an activator of SABTR which activates the SABTR and causes or increases an intracellular response when it binds to a SABTR compared to the intracellular response in the absence of the SABTR. Additionally or alternatively, sucralose may decrease internalization of a cell surface receptor such that the cell surface expression of a receptor is increased as compared to the number of cell surface receptors present on the surface of a cell in the absence of an agonist.

An antagonist is an agonist which binds to the receptor at the same (competitive antagonist) or at a different site (alllosteric antagonist) as the agonist/sucralose, but does not activate an intracellular response initiated by an active form of a receptor, thereby inhibiting the intracellular response induced by an agonist as compared to the intracellular response in the presence of an agonist and in the absence of an antagonist.

An inhibitor decreases the binding of an agonist/sucralose to the receptor as compared to the binding of the agonist in the absence of inhibitor, and/or decreases the intracellular response induced by an agonist.

An enhancer increases the binding of an agonist/sucralose to the receptor as compared to the binding of the agonist in the absence of enhancer, and/or increases the intracellular response induced by an agonist.

The activity, or changes in activity, of a receptor binding an agonist and transmitting the signal through, for example, a G-protein (i.e. due to different interactions with modulators) can be determined by the assays described herein-below.

Example Assays to Identify Modulators of the SABTR Receptor:

Detection of Changes of Cytoplasmic Ions or Membrane Voltage:

Cells are loaded with ion sensitive dyes to report receptor activity, as described in detail in "G-protein coupled receptors (Signal Transduction Series)", CRC Press 1999; 1st Edition; Eds Haga and Berstein. Changes in the concentration of ions in the cytoplasm or membrane voltage are measured using an ion sensitive or membrane voltage fluorescent indicator, respectively.

Calcium Flux:

Intracellular calcium release induced by the activation of GPCRs is detected using cell-permeant dyes that bind to calcium. The calcium-bound dyes generate a fluorescence signal that is proportional to the rise in intracellular calcium. The methods allows for rapid and quantitative measurement of receptor activity.

Cells used are transfected cells that co-express the SABTR GPCR and a G-protein which allows for coupling to the phospholipase C pathway as described herein-above. Negative controls include cells or their membranes not expressing SABTR (mock transfected), to exclude possible non-specific effects of the candidate compound. The calcium flux detection protocol is described in detail in "G-protein coupled receptors (Signal Transduction Series)"; Editors: Tatsuya Haga and Gabriel Berstein, 1st ed., 424 pp. CRC Press—Boca Raton Fla.; September 1999, and an adapted version with is summarised below:

Day 0: 96-well plates are seeded with 8.5K cells per well and maintained at 37° C. overnight in nutritive growth media.

Day 1: Cells are transfected using 150 ng of SABTR GPCR DNA and 0.3 µl of Lipofectamine 2000 (Invitrogen) per well. Transfected cells are maintained at 37° C. overnight in nutritive growth media.

Day 2: Growth media is discarded and cells are incubated for 1 hour (at room temperature in the dark) with 50 µl of calcium assay solution consisting of 1.5 µM Fluo-4 AM (Molecular Probes) and 2.5 µM probenicid dissolved in C1 buffer solution which contains 130 mM NaCl, 5 mM KCl, 10 mM Hepes, 2 mM CaCl2 and 10 mM glucose (pH 7.4) at 37° C. 125 µl of C1 buffer is added to each well and the plate is further incubated for 30 minutes at room temperature in the dark.

Buffer solutions are discarded and plate is washed 5 times with 100 µl C1 buffer as a washing buffer and cells are reconstituted in 200 µl of C1 buffer.

Then the plate is placed in a fluorescent microplate reader, for example, the Flexstation (Molecular Devices) or the FLIPR (Molecular Devices) and receptor activation is initiated following addition of 20 µl of a 10× concentrated agonist stock solution. Fluorescence is continuously monitored for 15 seconds prior to agonist addition and for 45-110 seconds after agonist addition. Receptor activation levels are defined as by the two following equations: % Activation=(Maximum fluorescence−baseline fluorescence/baseline fluorescence)*100 or Fluorescence Increase=Maximum Fluorescence−baseline fluorescence, where baseline fluorescence represents the average fluorescence levels prior to agonist addition.

Useful cells are, without limitation, mammalian cells as described herein-above, for example HEK293T cells and HEK293 T-Rex™ cells. Cells may be transfected with a GPCR and a G-Protein transiently or stably as is well known in the art. An excellent heterologous expression system is described in detail in WO 2004/055048.

A calcium flux assay can be performed, for example, as described in example 1 herein-below.

The identification of a modulator is performed as described above subject to the following modifications. The signals are compared to the baseline level of SABTR activity obtained from recombinant cells expressing SABTR in the presence of an agonist but in the absence of a test agent. An increase or decrease in SABTR activity, for example of at least 2 fold, at least 5 fold, at least 10 fold, at least a 100 fold, or more identifies a modulator.

Alternatively, the identification involves an increase or decrease fluorescence intensity of, for example, 10% or more, when compared to a sample without modulator, or when compared to a sample with modulator but in cells that do not express the SABTR polypeptide (mock-transfected cells).

Adenylate Cyclase Activity:

Assays for adenylate cyclase activity are performed, for example, as described in detail by Kenimer & Nirenberg, 1981, Mol. Pharmacol. 20: 585-591. Reaction mixtures are incubated usually at 37° C. for less than 10 minutes. Following incubation, reaction mixtures are deproteinized by the addition of 0.9 ml of cold 6% trichloroacetic acid. Tubes are centrifuged and each supernatant solution is added to a Dowex AG50W-X4 column. The cAMP fraction from the column is eluted with 4 ml of 0.1 mM imidazole-HCl (pH 7.5) into a counting vial in order to measure the levels of cAMP generated following receptor activation by the agonist. Control reactions should also be performed using protein homogenate from cells that do not express a SABTR polypeptide.

IP3/$Ca^{2+}$ Signals:

In cells expressing G-proteins, signals corrseponding to inositol triphosphate (IP3)/$Ca^{2+}$ and thereby receptor activity can be detected using fluorescence. Cells expressing a SABTR GPCR may exhibit increased cytoplasmic calcium levels as a result of contribution from both intracellular stores and via activation of ion channels, in which case it may be desirable, although not necessary, to conduct such assays in calcium-free buffer, optionally supplemented with a chelating agent such as EDTA, to distinguish fluorescence response resulting from calcium release from internal stores.

Phospholipase C/Intracellular $Ca^{2+}$ Signals:

SABTR is expressed in a cell with a G-protein that links the receptor to a phospholipase C signal transduction pathway. Changes in intracellular $Ca^{2+}$ concentration are measured, for example using fluorescent $Ca^{2+}$ indicator dyes and/or fluorometric imaging.

GTPase/GTP Binding:

For a GPCR including SABTR, a measure of receptor activity is the binding of GTP by cell membranes containing the GPCR. Measured is the G-protein coupling to membranes by detecting the binding of labelled GTP.

Membranes isolated from cells expressing the receptor are incubated in a buffer containing 35S-GTPγS and unlabelled GDP. Active GTPase releases the label as inorganic phosphate, which is detected by separation of free inorganic phosphate in a 5% suspension of activated charcoal in 20 mM $H_3PO_4$, followed by scintillation counting. The mixture is incubated and unbound labelled GTP is removed by filtration onto GF/B filters. Bound and labelled GTP is measured by liquid scintillation counting. Controls include assays using membranes isolated from cells not expressing SABTR (mock-transfected), in order to exclude possible non-specific effects of the test agent. The method is described in detail by Traynor and Nahorski, 1995, Mol. Pharmacol. 47: 848-854.

To identify modulators, as described herein-above, a change (increase or decrease) of 10% or more in GTP binding or GTPase activity is usually sufficient. However, to identify agonists, the assays described herein-above are performed subject to the following modifications. An agent is identified as an agonist usually if the activity is at least 50% of that of a known agonist (for example perillartine) when the compound is present at 100 mM or less, for example 10 to 500 µM, for example about 100 µM, or if it will induce a level the same as or higher than that induced by a known agonist.

Microphysiometer or Biosensor:

Such assays can be performed as described in detail in Hafner, 2000, Biosens. Bioelectron. 15: 149-158.

Arachinoid Acid:

The intracellular level of arachinoid acid is employed as an indicator of receptor activity. Such a method is described in detail by Gijon et al., 2000, J. Biol. Chem., 275:20146-20156.

cAMP/cGMP:

Intracellular or extracellular cAMP is measured using a cAMP radioimmunoassay (RIA) or cAMP binding protein, for example as described by Horton & Baxendale, 1995, Methods Mol. Biol. 41: 91-105. Alternatively, a number of kits for the measurement of cAMP are commercially available, for example the High Efficiency Fluorescence Polarization-based homogeneous assay by LJL Biosystems and NEN Life Science Products. Alternatively, the intracellular or extracellular levels of cGMP may measured using an immunoassay. For example, the method described in Felley-Bosco et al., Am. J. Resp. Cell and Mol. Biol., 11:159-164 (1994), may be used to determine the level of cGMP. Alternatively an assay kit for measuring cAMP and/or cGMP as described in U.S. Pat. No. 4,115,538 can be used.

Negative controls with mock-transfected cells or extracts thereof to exclude possible non-specific effects of test agents may be used.

DAG/IP3:

Second messengers Diacylglycerol (DAG) and/or inositol triphosphate (IP3), which are released by Phospholipid breakdown, that is caused by receptor activity, can be detected and used as an indicator of GPCR (SABTR) activity, for example as described in Phospholipid Signalling Protocols, edited by Ian M. Bird, Totowa, N.J., Humana Press, 1998. Alternatively, kits for the measurement of inositol triphosphates are available commercially from Perkin Elmer and CisBio International.

Negative controls with mock-transfected cells or extracts thereof to exclude possible non-specific effects of test agents may be used.

PKC Activity:

Growth factor receptor tyrosine kinases can signal via a pathway involving activation of Protein Kinase C (PKC), which is a family of phospholipid- and calcium-activated protein kinases.

Increases in gene products induced by PKC show PKC activation and thereby receptor activity. These gene products include, for example, proto-oncogene transcription factor-encoding genes (including c-fos, c-myc and c-jun), proteases, protease inhibitors (including collagenase type I and plasminogen activator inhibitor), and adhesion molecules (including intracellular adhesion molecule I (ICAM I)).

PKC activity may be directly measured as described by Kikkawa et al., 1982, J. Biol. Chem. 257: 13341, where the phosphorylation of a PKC substrate peptide, which is subsequently separated by binding to phosphocellulose paper, is measured. It can be used to measure activity of purified kinase, or in crude cellular extracts. Protein kinase C sample can be diluted in 20 mM HEPES/2 mM DTT immediately prior to the assay.

An alternative assay can be performed using the Protein Kinase C Assay Kit commercially available by PanVera.

The above-described PKC assays are performed on extracts from cells expressing the GPCR (SABTR).

Alternatively, activity can be measured through the use of reporter gene constructs driven by the control sequences of genes activated by PKC activation.

Negative controls with mock-transfected cells or extracts thereof to exclude possible non-specific effects of test agents may be used.

MAP Kinase Activity:

MAP kinase activity can be measured using commercially available kits, for example, the p38 MAP Kinase assay kit by New England Biolabs, or the FlashPlate™ MAP Kinase assays by Perkin-Elmer Life Sciences. p42/44 MAP kinases or ERK1/2 can be measured to show GPCR (SABTR) activity when cells with Gq and Gi coupled GPCRs are used, and an ERK1/2 assay kit is commercially available by TGR Biosciences, which measures the phosphorylation of endogenous ERK1/2 kinases following GPCR activation.

Alternatively, direct measurements of tyrosine kinase activity through known synthetic or natural tyrosine kinase substrates and labelled phosphate are well known; the activity of other types of kinases (for example, Serine/Threonine kinases) can be measured similarly.

All kinase assays can be performed with both purified kinases and crude extracts prepared from cells expressing one or more SABTR polypeptide.

The substrates of kinases that are used can be either full-length protein or synthetic peptides representing the substrate. Pinna & Ruzzene (1996, Biochem. Biophys. Acta 1314: 191-225) lists a number of phosphorylation substrate sites useful for detecting kinase activities. A number of kinase substrate peptides are commercially available. One that is particularly useful is the "Src-related peptide," RRLIEDAEYAARG (commercially available from Sigma), which is a substrate for many receptor and nonreceptor tyrosine kinases. Some methods require the binding of peptide substrates to filters, then the peptide substrates should have a net positive charge to facilitate binding. Generally, peptide substrates should have at least 2 basic residues and a free-amino terminus. Reactions generally use a peptide concentration of 0.7-1.5 mM.

Negative controls with mock-transfected cells or extracts thereof to exclude possible non-specific effects of test agents may be used.

Transcriptional Reporters/SABTR-Responsive Promoter/Reporter Gene:

To identify modulators with reporter gene assays, an at least 2-fold increase or 10% decrease in the signal is significant. An agonist stimulates for example at least 2-fold, 5-fold, 10-fold or more when comparing activity in presence and absence of the test agent. The intracellular signal initiated by binding of an agonist to SABTR sets in motion a cascade of intracellular events, the ultimate consequence of which is a rapid and detectable change in the transcription or translation of one or more genes.

The activity of the receptor can therefore be determined by measuring the expression of a reporter gene driven by a promoter responsive to SABTR activation.

A "promoter" as used herein is one or more transcriptional control elements or sequences necessary for receptor-mediated regulation of gene expression, including one or more of basal promoter, enhancers and transcription-factor binding sites necessary for receptor-regulated expression. Promoters responsive to the intracellular signals resulting from agonist binding to SABTR are selected and operatively linked to a corresponding promoter-controlled reporter gene whose transcription, translation or ultimate activity is readily detectable and measurable.

Reporter genes may be selected, for example, from luciferase, CAT, GFP, β-lactamase, β-galactosidase, and the so-called "immediate early" genes, c-fos proto-oncogene, transcription factor CREB, vasoactive intestinal peptide (VIP) gene, the somatostatin gene, the proenkephalin gene, the phosphoenolpyruvate carboxy-kinase (PEPCK) gene, genes responsive to NF-κB, and AP-1-responsive genes (including the genes for Fos and Jun, Fos-related antigens (Fra) 1 and 2, IκBα, ornithine decarboxylase, and annexins I and II).

Promoters will be selected according to the selected reporter gene, as will be apparent to the skilled person.

Luciferase, CAT, GFP, β-lactamase, β-galactosidase and assays for the detection of their products are well known in the art. Examples of further reporter genes are described herein-below.

The "immediate early" genes are suitable and are rapidly induced (for example within minutes of contact between the receptor and the effector protein or agonist). Desirable properties in reporter genes include one or more of the following: rapid responsiveness to agonist binding, low or undetectable expression in quiescent cells; induction that is transient and independent of new protein synthesis; subsequent shut-off of transcription requires new protein synthesis; and mRNAs transcribed from these genes which have a short half-life of several minutes to a few hours. Similarly, the promoter may have one, several or all of these properties.

The c-fos proto-oncogene is an example of a gene that is responsive to a number of different stimuli and has an rapid induction. The c-fos regulatory elements include a TATA box that is required for transcription initiation; two upstream elements for basal transcription, and an enhancer, which includes an element with dyad symmetry and which is required for induction by TPA, serum, EGF, and PMA. The 20 bp c-fos transcriptional enhancer element located between −317 and −298 bp upstream from the c-fos mRNA cap site, is essential for serum induction in serum starved NIH 3T3 cells. One of the two upstream elements is located at −63 to −57 and it resembles the consensus sequence for cAMP regulation.

The transcription factor CREB (cyclic AMP responsive element binding protein) is responsive to levels of intracellular cAMP. Therefore, the activation of a receptor that signals via modulation of cAMP levels can be determined by detecting either the binding of the transcription factor, or the expression of a reporter gene linked to a CREB-binding element (termed the CRE, or cAMP response element). The DNA sequence of the CRE is TGACGTCA. Reporter constructs responsive to CREB binding activity are described in U.S. Pat. No. 5,919,649.

Other suitable reporter genes and their promoters include the vasoactive intestinal peptide (VIP) gene and its promoter which is cAMP responsive; the somatostatin gene and its promoter which is cAMP responsive; the proenkephalin and its promoter which is responsive to cAMP, nicotinic agonists, and phorbol esters; and the phosphoenolpyruvate carboxykinase (PEPCK) gene and its promoter which is cAMP responsive.

Additional examples of reporter genes and their promoters that are responsive to changes in GPCR activity include the AP-1 transcription factor and NF-κB. The AP-1 promoter is characterised by a consensus AP-1 binding site which is the palindrome TGA(C/G)TCA. The AP-1 site is also responsible for mediating induction by tumor promoters including the phorbol ester 12-O-tetradecanoylphorbol-β-acetate (TPA), and are therefore sometimes also referred to as a TRE, for TPA-response element. AP-1 activates numerous genes that are involved in the early response of cells to growth stimuli. Examples of AP-1-responsive genes include the genes for Fos and Jun (which proteins themselves make up AP-1 activity), Fos-related antigens (Fra) 1 and 2, IκBα, ornithine decarboxylase, and annexins I and II.

A large number of genes have been identified as NF-κB responsive, and their control elements can be linked to a reporter gene to monitor GPCR activity. Genes responsive to NF-κB include for example those encoding IL-1β, TNF-α, CCR5, P-selection, Fas ligand, GM-CSF and IκBα. Vectors encoding NF-κB-responsive reporters are known in the art or can be readily formed using ordinary skill in the art, for example, synthetic NF-κB elements and a minimal promoter, or using the NF-κB-responsive sequences of a gene known to be subject to NF-κB regulation. Further, NF-κB responsive reporter constructs are commercially available from, for example, CLONTECH.

A given promoter construct can easily be tested by exposing GPCR (SABTR)-expressing cells, transfected with the construct, to an agonist (for example perillartine).

An increase of at least 2-fold in the expression of reporter gene in response to the agonist indicates that the reporter is suitable to measure GPCR (SABTR) activity.

Controls for transcription assays include both cells not expressing GPCR (SABTR), but carrying the reporter construct, and cells with a promoterless reporter construct.

Agents that modulate GPCR (SABTR) activity as shown by reporter gene activation can be verified by using other promoters and/or other receptors to verify GPCR (SABTR) specificity of the signal and determine the spectrum of their activity, thereby excluding any non-specific signals, for example non-specific signals via the reporter gene pathway.

Inositol Phosphates (IP) Measurement:

Phosphatidyl inositol (PI) hydrolysis may be determined as described in U.S. Pat. No. 5,436,128, which involves labelling of cells with 3H-myoinositol for at least 48 hours or more. The labelled cells are contacted with a test agent for one hour, then these cells are lysed and extracted in chloroform-methanol-water. This is followed by separating the inositol phosphates by ion exchange chromatography and quantifying them by scintillation counting. For agonists, fold stimulation is determined by calculating the ratio of counts per minute (cpm) in the presence of tested agent, to cpm in the presence of buffer control. Likewise, for inhibitors and antagonists, fold inhibition is determined by calculating the ratio of cpm in the presence of test agent, to cpm in the presence of buffer control (which may or may not contain an agonist).

Binding Assays:

Alternatively to the functional assays described hereinabove that measure a change in parameters caused by a functional response to agonist binding, agonist binding may be determined by binding assays that measure the binding of an agonist to a SABTR receptor.

Binding assays are well known in the art and can be tested in solution, in a bilayer membrane, optionally attached to a solid phase, in a lipid monolayer, or in vesicles. Binding of a modulator to a SABTR polypeptide can be determined, for example, by measuring changes in spectroscopic characteristics (for example fluorescence, absorbance, or refractive index), hydrodynamic methods (employing for example shape), chromatography, measuring solubility properties of a SABTR polypeptide. In one embodiment, binding assays are biochemical and use membrane extracts from cells/tissue expressing recombinant SABTR polypeptides. A binding assay may, for example, be performed as described for T1Rs by Adler et al. in US20050032158, paragraphs [0169] to [0198].

A substantially homologous SABTR protein includes, without limitation, such proteins where all or parts of the protein are replaced with the relevant part of an allelic variant or different species, including a TAS2R or SABTR from mouse, rat, hamster, ape, and dog.

Further, substantially homologous SABTR nucleotide or polypeptide sequences may be formed by conservative mutations and/or point mutations and include, without limitation, any conservatively modified variant as detailed below.

With respect to nucleotide/nucleic acid sequences, conservatively modified variants means nucleic acids which encode identical or essentially identical amino acid sequences (conservatively substituted amino acids, i.e. lysine switched to arginine and further examples as explained herein-below).

Because of the degeneracy of the genetic code, a large number of nucleic acids different in sequence but functionally identical encode any given polypeptide/protein. Such nucleic acid variations are "silent variations," which are one species of conservatively modified variations. Each nucleic acid sequence which encodes a polypeptide also describes every possible silent variation of the nucleic acid. Therefore, each codon in a nucleic acid (except AUG, which is ordinarily the only codon for methionine, and TGG, which is ordinarily the only codon for tryptophan) can be modified to yield a functionally identical nucleic acid sequence that will produce an identical polypeptide. Accordingly, each silent variation of a nucleic acid which encodes a polypeptide is implicit in each given nucleic acid sequence.

With respect to amino acid sequences, amino acid substitutions may be introduced using known protocols of recombinant gene technology including PCR, gene cloning, site-directed mutagenesis of cDNA, transfection of host cells, and in-vitro transcription which may be used to introduce such changes to the SABTR sequence. The variants can then be screened for taste-cell-specific GPCR functional activity. Conservative substitution tables providing functionally similar amino acids are well known in the art. For example, one exemplary guideline to select conservative substitutions includes (original residue followed by exemplary substitution): ala/gly or ser; arg/lys; asn/gln or his; asp/glu; cys/ser; gln/asn; gly/asp; gly/ala or pro; his/asn or gln; ile/leu or val; leu/ile or val; lys/arg or gin or glu; met/leu or tyr or ile; phe/met or leu or tyr; ser/thr; thr/ser; trp/tyr; tyr/trp or phe; val/ile or leu.

An alternative exemplary guideline uses the following six groups, each containing amino acids that are conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (1); 5) Isoleucine (I), Leucine (L), Methionine (M), Valine (V); and 6) Phenylalanine (F), Tyrosine (Y), Tryptophan (W).

Another alternative guideline is to allow for all charged amino acids as conservative substitutions for each other whether they are positive or negative.

In addition, individual substitutions, deletions or additions that alter, add or delete a single amino acid or a small percentage (for example up to 26%, or up to 20%, or up to 10%) of amino acids in an encoded sequence are also considered to be conservatively modified variations.

Substantially homologous nucleotide or polypeptide sequences have the degree of sequence identity or hybridize under certain stringent hybridization conditions as indicated below.

% Sequence Identity:

A substantially homologous nucleotide sequence has a % sequence identity of at least at least 90%, at least 95%, or at least 98%.

A substantially homologous polypeptide sequence has a % sequence identity of at least at least 90%, at least 95% or at least 98%.

Alternatively, substantially homologous nucleotide or polypeptide sequences may have a % sequence identity of at least 70%, 80%, or 85%, and are conservative functional variants as detailed herein above.

Calculation of % Sequence Identity is Determined as Follows.

BLAST (Basic Local Alignment Search Tool) is the heuristic search algorithm employed by the programs blastn which is available at http://www.ncbi.nlm.nih.gov.

To determine % identity of a nucleotide query sequence against another nucleotide sequence, Blastn is used, using default parameters of BLAST version 2.2.1.3, including an EXPECT (statistical significance threshold for reporting matches against database sequences) of 10, and DUST filtering.

To determine % identity of a polypeptide query sequence against another polypeptide sequence, Blastp is used, using default parameters of BLAST version 2.2.1.3, including an EXPECT of 10, and DUST filtering.

Stringent Hybridization Conditions:

Nucleotide sequences are considered substantially homologous provided that they are capable of selectively hybridizing to the nucleotide sequences presented herein, or to their complement, under stringent hybridisation conditions detailed below. Stringent conditions are temperature of 42° C. in a solution of 50% formamide, 5×SSC, and 1% SDS and washing at 65° C. in a solution of 0.2×SSC and 0.1% SDS (1×SSC=0.15 M NaCl, 0.015 M Na3 Citrate pH 7.0).

Background hybridization may occur because of other nucleotide sequences present, for example, in the cDNA or genomic DNA library being screened.

A signal that is less than 10 fold as intense as the specific interaction observed with the target DNA is considered background. The intensity of interaction may be measured, for example, by radiolabelling the probe, e.g. with $^{32}P$.

Kit to Identify a Modulator:

A kit, for example, a screening kit or high throughput screening kit, that comprises recombinant cells that express the SABTR, or a substantially homologous sequence thereto; and that comprises sucralose (agonist).

Optionally, the cells further comprise a G-protein for example for calcium signalling. Suitable G-proteins are known and described herein-above; the skilled person is aware how to introduce them to the cells if necessary. A very useful chimeric G-protein is Galpha16-gustducin 44.

Sucralose is provided in suitable concentrations, for example, about 0.03 to about 1000 millimolar, about 0.05 to about 500 millimolar, about 0.1 to about 250 millimolar, or about 0.3 to about 100 millimolar.

Optional kit components may include a suitable medium for culturing the recombinant cells provided, and a solid support to grow the cells on, for example, a cell culture dish or microtiter plate, these optional components will be readily available to the skilled person.

The kit may be used as follows:
(i) Recombinant cells that express the SABTR protein are grown on the solid support;
(ii) test agents at concentrations from about 1 nM to about 100 mM or more are added to the culture medium of defined plates or wells in the presence of the agonist sucralose in a suitable concentration; and
(iii) a change in a functional response of the cells is determined by comparing the response in presence and absence of the test agent, and the test agent is thereby identified as a modulator.

For example, (iii) may be performed according to any one of the assays described-herein above, in combination with any one of the detection methods that report receptor activity described herein-above. This may require specifically chosen or adapted recombinant cells, which are also described herein-above.

A suitable assay is, for example, the calcium flux assay to determine activation of SABTR and its change in response to a test agent.

The kit may be used to identify an enhancer as follows:
(i) Recombinant cells that express the SABTR protein are grown on the solid support;
(ii) rest agents at concentrations from about 1 nM to about 100 mM or more are added to the culture medium of defined plates or wells in the presence of the sucralose agonist in a suitable concentration; and
(iii) a change in a functional response of the cells to the agonist is determined by comparing the response in presence and absence of the test agent, and the test agent is thereby identified as an enhancer.

Confirmation of Identified Modulators:

A modulator identified by a method described herein-above may easily be confirmed by simple sensory experiments using a panel of flavorists or test persons to taste the identified modulators. The compounds are tasted e.g. in water together with sucralose in comparison to a negative control without modulator to confirm a modulator that enhances the sweet taste of sucralose or inhibits the bitter taste of sucralose.

Large Scale Screening Assays:

Transcriptional reporter assays and most cell-based assays described herein-above are well suited for screening libraries for agents that modulate SABTR activity.

The assays may be designed to screen large chemical libraries by automating the assay steps and providing compounds from any convenient source to the assays, which are typically run in parallel (for example in microtiter formats on microtiter plates in robotic assays).

Assays may be run in high throughput screening methods that involve providing a combinatorial chemical or peptide library containing a large number of potential modulators. Such libraries are then screened in one or more assays described herein-above to identify those library agents (particular chemical species or subclasses) that display the activity described herein-above. The modulators thus identified can be directly used or may serve as leads to identify further modulators by making and testing derivatives.

Synthetic compound libraries are commercially available from a number of companies including Maybridge Chemical Co. (Trevillet, Cornwall, UK), Comgenex (Princeton, N.J.), Brandon Associates (Merrimack, N.H.), and Microsource (New Milford, Conn.).

Libraries of Test Agents:

A combinatorial chemical library is a collection of diverse chemical compounds generated by either chemical synthesis or biological synthesis, by combining a number of chemical "building blocks" such as reagents. For example, a linear combinatorial chemical library such as a polypeptide library is formed by combining a set of chemical building blocks (amino acids) in every possible way for a given compound length (i.e., the number of amino acids in a polypeptide compound). Millions of chemical compounds can be synthesized through such combinatorial mixing of chemical building blocks.

A rare chemical library is available from Aldrich (Milwaukee, Wis.).

Libraries of natural compounds in the form of bacterial, fungal, plant and animal extracts are commercially available for example from Pan Laboratories (Bothell, Wash.) or Myco-Search (NC), or are readily produceable by methods well known in the art. Additionally, natural and synthetically produced libraries and compounds are readily modified through conventional chemical, physical, and biochemical means.

Other libraries include protein/expression libraries, cDNA libraries from natural sources, including, for example, foods, plants, animals, bacteria, libraries expressing randomly or systematically mutated variants of one or more polypeptides, genomic libraries in viral vectors that are used to express the mRNA content of one cell or tissue.

In a high throughput assay, it is possible to screen up to several thousand different modulators or agonists in a single day. In particular, each well of a microtiter plate can be used to run a separate assay against a selected potential modulator, or, if concentration or incubation time effects are to be observed, every 5-10 wells can test a single modulator. Thus, a single standard microtiter plate can assay about 100 modulators. If 1536 well plates are used, then a single plate can easily assay from about 100 to about 1500 different compounds. It is possible to assay several different plates per day; assay screens for up to about 6,000-20,000 different compounds is possible.

Types of Test Agents that May be Tested for their SABTR Modulating Effect in the Assay Methods:

The test agents may be any agent including small chemical compounds, chemical polymers, biological polymers, peptides, proteins, sugars, carbohydrates, nucleic acids and lipids. An agent can be a synthetic compound, a mixture of compounds, a natural product or natural sample, for example plant extract, culture supernatant, or tissue sample.

Identified modulators including but not limited to ((E)-4-(2,2,3-trimethylcyclopent-3-enyl)but-2-enoic acid) may be added to food products together with sucralose to decrease its bitter off-taste and/or enhance its sweet taste.

Consumables include food products, beverages, oral care products, and compositions for admixture to such products, in particular flavour compositions. Flavour compositions may be added to processed foods or beverages during their processing, or they may actually be consumables in their own right, e.g. condiments such as sauces and the like. Sweet tastants are particularly interesting in confectionary and other sweet consumables including desserts, but also in savoury and sweet-sour consumables. Examples of consumables include confectionary products, cakes, cereal products, baker's products, bread products, gums, chewing gums, sauces (condiments), soups, processed foods, cooked fruits and vegetable products, meat and meat products, egg products, milk and dairy products, cheese products, butter and butter substitute products, milk substitute products, soy products, edible oils and fat products, medicaments, beverages, alcoholic drinks, beers, soft drinks, food extracts, plant extracts, meat extracts, condiments, sweeteners, nutraceuticals, pharmaceutical and non-pharmaceutical gums, tablets, lozenges, drops, emulsions, elixirs, syrups and other preparations for making beverages, instant beverages and effervescent tablets.

Sequences of Nucleic Acids and Proteins:

The sequences employed in the constructs and methods described-herein can be found in the sequence listing hereinbelow. They are given in aminoterminal to carboxyterminal direction. All TAS2R sequences are human sequences.

The TAS2R receptor CDS coding sequences are known and have been published under the names and reference numbers indicated below.

SEQ ID NO:1+2 TAS2R44 coding sequence. Human taste receptor type 2 member 44 (TAS2R44, or T2R44), Reference Sequence Accession Number (RefSeq) NM_176885.2, GI:116235453 RefSeq database, The National Center for Biotechnology Information (NCBI)), and the corresponding receptor protein (NP_795366.2 GI:116235454, NCBI RefSeq).

SEQ ID NO: 3&4 TAS2R1 coding sequence. Human taste receptor type 2 member 1 (TAS2R1, or T2R1), Reference Sequence Accession Number (RefSeq) NM_019599.2 GI:67782322 RefSeq database, The National Center for Biotechnology Information (NCBI)), and the corresponding receptor protein (NP_062545.1, GI:9625043, NCBI RefSeq).

SEQ ID NO: 5&6 TAS2R10 coding sequence. Human taste receptor type 2 member 10 (TAS2R10, or T2R10), Reference Sequence Accession Number (RefSeq) NM_023921.1 GI:12965179 RefSeq database, The National Center for Biotechnology Information (NCBI)), and the corresponding receptor protein (NP_076410.1 GI:12965180).

SEQ ID NO: 7&8 TAS2R46 coding sequence. Human taste receptor type 2 member 46 (TAS2R46, or T2R46), Reference Sequence Accession Number (RefSeq) NM_176887.2 GI:117414132 RefSeq database, The National Center for Biotechnology Information (NCBI)), and the corresponding receptor protein (NP_795368.2 GI:117414133).

SEQ ID NO: 9&10 TAS2R16 coding sequence. TAS2R16 coding sequence. Human taste receptor type 2 member 16 (TAS2R16, or T2R16), Reference Sequence Accession Number (RefSeq) NM_016945.2 GI:68160949 RefSeq database, The National Center for Biotechnology Information (NCBI)), and the corresponding receptor protein (NP_058641.1 GI:8394395).

All coding sequences include the ATG start codon but not the stop codon. When cloned into an expression vector, the complete cassette in the vector will include the N-terminal rss tag as a membrane sequence, and the C-terminal HSV tag which provides the STOP codon (as shown as an example in SEQ ID NO: 13&14 for the TAS2R44 vector cassette).

| | |
|---|---|
| SEQ ID NO: 1&2 | TAS2R44 coding sequence (nucleic acid + protein) |
| SEQ ID NO: 3&4 | TAS2R1 coding sequence (nucleic acid + protein) |
| SEQ ID NO: 5&6 | TAS2R10 coding sequence (nucleic acid + protein) |
| SEQ ID NO: 7&8 | TAS2R46 coding sequence (nucleic acid + protein) |
| SEQ ID NO: 9&10 | TAS2R16 coding sequence (nucleic acid + protein) |
| SEQ ID NO: 11 | RSS Tag includes 45 aminoacids of rat somatostatin and EcoRI site |
| SEQ ID NO: 12 | Includes HSV tag, "T" to get into frame, NotI site and STOP codon |
| SEQ ID NO: 13&14 | hTAS2R44 construct (nucleic acid + protein) (RSS Tag-EcoRI site-TAS2R44-NotI site-HSV Tag with STOP) |

There now follows a series of examples that serve to illustrate the above-described methods. The following examples are merely illustrative and should not be construed as limiting the described subject matter including the methods and kit in any manner.

EXAMPLES

All examples use the DNA sequences based on the mRNA for the respective human bitter taste receptor type 2 member (44, 1, 10, 16, and 46).

Example 1

Generation of Human TAS2R44, TAS2R1, TAS2R10, TAS2R16, TAS2R46 Expression Vector The example below is described for TAS2R44. When TAS2R44 cDNA is replaced with the relevant cDNAs of TAS2R1, TAS2R10, TAS2R46, expression vectors for these SABTRs or for TAS2R16 (as a control that is not activated by sucralose) are produced.

The full length gene of human TAS2R44 was amplified by polymerase chain reaction (PCR) using gene-specific primers that span the entire coding region.

The TAS2R44 cDNA was subcloned into an expression cassette based on either of the following plasmids/expression vectors: pcDNA3.1Zeo (Invitrogen, Carlsbad, Calif., US). These vectors contain within their multiple cloning sites the nucleotide sequence coding for the first 45 amino acids of the rat somatostatin receptor subtype 3 (included in SEQ ID:11, RSS tag) to facilitate cell surface targeting of the transgene, and the nucleotide sequence coding for the herpes simplex virus (HSV) glycoprotein D epitope (HSV epitope) for facilitating immunocytochemical detection, which is included in SEQ ID:12, HSV Tag.

RSS tag, TAS2R44, and the HSV tag are fused in frame in the hTASR2 construct of SEQ ID:13 to allow translation into the receptor protein. The resulting receptor cDNA in the expression vector comprises the joined amino acid sequences of TAS2R44 preceded by SEQ ID NO:11 (RSS tag including 45 aminoacids of rat somatostatin) and followed by SEQ ID NO: 12 (HSV tag) (in aminoterminal to carboxyterminal direction).

The construct transfected into an expression vector is called pcDNA3.1Zeo-TAS2R44 and allows for expression of the TAS2R44 protein (SEQ ID:14).

For TAS2R1, TAS2R10, TAS2R46 and TAS2R16, a similar cloning strategy is followed using their coding sequences (SEQ ID NO:3&4 for TAS2R1, SEQ ID NO:5&6 for TAS2R10, SEQ ID NO: 7&8 for TAS2R46, and SEQ ID NO:9&10 for TAS2R16). The restriction enzymes are adapted accordingly (for TAS2R1 EcoRI indicated above for TASR44 is exchanged by a suitable restriction enzyme that does not cut within the coding sequence).

Example 2

Example 2a

Generation of Stable Cell Lines

HEK293T/Gα16-gustducin 44 cells were used; they are formed as described in WO 2004/055048. The host cell line HEK-293T is commercially available from the American Tissue Culture Collection (ATCC), ATCC®# CRL-11268

Example 2b

Transient Transfection/Expression of TAS2Rs in HEK293T/Gα16-gustducin 44 Cells

On day 0, the HEK293T/Gα16-gustducin 44 cells are plated in 96-well black wall, clear-bottom plates at a density of 14,000 cells per well and grown overnight in growth media (DMEM with 10% (v/v) heat-inactivated fetal bovine serum, 2 mM L-glutamine, 100 units/ml penicillin, 100 µg/ml streptomycin).

On day 1, the media is changed to an antibiotic-free and serum-free DMEM.

The cells are transfected with Lipofectamine 2000 (Invitorgen) according to the manufacturers recommendations.

Per well of a 96-well plate, 150 ng of vector DNA (SABTR expression vectors or TAS2R16 expression vector from example 1) is diluted in 12.5 µl of DMEM. In a second tube, 0.3 µl of Lipofectamine 2000 is diluted in 12.5 µl of DMEM and incubated for 5 min at room temperature. After the 5 min, both solutions are mixed and incubated for 20 min at RT. The growth medium in the plate is exchanged by 50 µl of DMEM and 25 µl of the lipofectamine/DNA mixture is incubated on the cells for 3-4 hours at 37° in a humidified atmosphere. This mixture is then replaced with an antibiotic-free, serum-containing DMEM.

24 hours post transfection, the cells are used in the Fluo-4 Calcium Assay described in Example 3.

Example 2c

Generation of a Cell Line Stably Expressing Gα16-gustducin44 and a SABR (TAS2R44, TAS2R1, TAS2R10)

Cell lines that stably expresses a SABR (TAS2R44, TAS2R1, TAS2R10) was generated by transfecting pcDNA3.1Zeo-SABR into HEK293T/Gα16-gustducin 44 cells (both formed as described in example 1). The host cell line HEK-293T is commercially available from the American Tissue Culture Collection (ATCC), ATCC®# CRL-11268.

Transfection was performed as follows:

On day 0, the HEK293T Gα16-gustducin44 cells were seeded in a 6-well plate at a density of 900,000 cells per well and grown over night in selective growth medium.

On day 1, the medium was exchanged with 2 ml of antibiotic-free and serum-free growth medium. 10 µl Lipofectamine 2000 was dissolved in 250 µl DMEM and incubated for 5 minutes at room temperature. In parallel, 4 mg SABR (TAS2R44, TAS2R1, TAS2R10) vector DNA were dissolved in 250 µl DMEM. These two resulting solutions are mixed and incubated for 20 minutes at room temperature before they are added to the cells into the cell culture medium. After 4 hours, the medium is replaced with antibiotic-free, serum-containing growth medium.

The cells were incubated in humidified atmosphere (37° C., 5% $CO_2$).

After 24 hours, the cells were re-plated in selective growth medium (DMEM with 10% (v/v) heat-inactivated fetal bovine serum, 2 mM L-glutamine, 100 units/ml penicillin, 100 µg/ml streptomycin, 200 mg/ml G418 and 200 mg/ml zeocin) and were further incubated in a humidified atmosphere (37° C., 5% $CO_2$).

After 2 to 4 weeks of culture (replacing medium as necessary), zeocin-resistant colonies were selected and expanded.

The expression of TAS2R44 was evaluated by testing for the presence of a functional response to the known TAS2R44 agonist saccharin (as described in WO 2004/029087) in addition to sucralose, which was determined via automated calcium imaging on the FLIPR-TETRA™ (Molecular Devices, Sunnyvale, Calif., US) as described in example 3. One clone was selected resulting in the HEK293T/Gα16-gustducin 44/TAS2R44 cell line.

TAS2R1 expressing cells were identified by their response to 0.5 mM chloramphenicol (a known TAS2R1 agonist as described in WO 2006/053771) in addition to sucralose, which was determined via automated fluorimetric imaging on the FLIPR-Tetra instrumentation (Molecular Devices) using the methods described in Example 3. One clone was selected resulting in the HEK293T/Gα16-gustducin 44/TAS2R1 cell line.

TAS2R10 expressing cells were identified by their response to 0.125 mM strychnine hydrochloride (a known TAS2R10 agonist as described in WO 2004/029087) in addition to sucralose, which was determined via automated fluorimetric imaging on the FLIPR-Tetra instrumentation (Molecular Devices) using the methods described in example 3. One clone was selected resulting in the HEK293T/Gα16-gustducin 44/TAS2R10 cell line.

Example 3

Fluo-4 Calcium Assay

Fluo-4AM (Invitrogen, Carlsbad, Calif., US) is a fluorescent indicator of intracellular calcium dynamics (change in concentration) and allows monitoring changes in the calcium concentration, particularly an increase in response to receptor activation occurring after agonist exposure.

At day 0, the HEK293T cell line expressing Gα16-gustducin44 and a TAS2R bitter taste receptor formed as described in examples 2b or 2c was seeded in antibiotic-free growth medium (standard DMEM with 10% (v/v) heat-inactivated fetal bovine serum, 2 mM L-glutamine standard DMEM with 10% (v/v) heat-inactivated fetal bovine serum, 2 mM L-glutamine, 100 units/ml penicillin, and 100 µg/ml streptomycin) into black wall/clear bottom 96-well plates, coated with poly(ethylenimine) (0.005% v/v) at a concentration of 15,000 cells per well and incubated for 48 hours in humidified atmosphere (37° C., 5% $CO_2$).

At the time of the assay, the growth medium was discarded and the cells were in humidified atmosphere (37° C., 5% $CO_2$) for 1 hour with 50 µl of loading buffer consisting of 1.5 µM Fluo-4 AM and 2.5 µM probenicid (Sigma-Aldrich, St. Louis, Mo., US) in DMEM.

Afterwards, the 96-well plate was washed 5 times with 100 µl of assay buffer (130 mM NaCl, 5 mM KCl, 10 mM HEPES, 2 mM $CaCl_2$, and 5 mM dextrose, pH 7.4) per well, using an automated plate washer (BioTek). The plate was further incubated for 30 minutes at room temperature in the dark to allow for complete de-esterification of the Fluo-4. Afterwards the plate was washed 5 times with 100 µl of assay buffer per well, and reconstituted with 100 µl of assay buffer per well.

For assay reading, the plate was placed in a Fluorometric Imaging Plate Reader (FLIPR) (FLIPR-TETRA™, Molecular Devices, Sunnyvale, Calif., US), and receptor activation was initiated by addition of 100 µl of a twofold concentrated agonist stock solution (to give the desired agonist end concentration when added to the 100 microliter assay buffer volume), which was prepared in assay buffer.

Fluorescence was continuously monitored for 20 seconds to give a signal baseline (averaged to give $F_0$) prior to agonist addition and for 120 seconds after agonist addition. The change in signal divided by $F_0$ gives $\Delta F/F_0$ indicated in the table, with $\Delta F$ being the maximum signal occurring within the 120 seconds minus the minimum signal (occurring within the 120 seconds after agonist addition.

All data was collected from at least two independent experiments each carried out in triplicate.

A concentration-response analysis was performed and $EC_{50}$ values were calculated by nonlinear regression using the function $f(x)=(a-d)/(1+(x/C)^{nh})+d$; with a=minimum signal, d=maximum signal, nh=hill coefficient, $C=EC_{50}$, and x=agonist concentration. $EC_{50}$ is the molar concentration of an agonist which produces 50% of the maximum possible effective response for that agonist. A more potent agonist will have a lower $EC_{50}$ value.

The obtained calcium signals were corrected for the response of cells expressing only the G Protein α subunit (Gα16-gustducin44) and normalized to the fluorescence of cells prior to the stimulus using $\Delta F/F0$ (Fmax−Fmin/F0).

Example 4

Activation of TAS2R44 by Saccharin

To confirm that the cell line formed in example 2c stably expresses the bitter taste receptor TAS2R44, a concentration-response curve for saccharin, a known agonist of TAS2R44, was generated. As a negative control, HEK293T Gα16gustducin44 cells (that do not express TAS2R44) were exposed to saccharin. The results are calculated as described in example 4 and are shown in table 1. The standard deviation (+/−STD) is also indicated.

TABLE 1

Activation of TAS2R44 by different concentrations of saccharin.

| Saccharin [mM] | TAS2R44 $\Delta F/F_0$ | TAS2R44 ± STD | Neg. Control $\Delta F/F_0$ | Neg. Control ± STD |
|---|---|---|---|---|
| 10.0000 | 1.354 | 0.131 | 0.020 | 0.022 |
| 5.0000 | 1.258 | 0.176 | 0.018 | 0.018 |
| 2.5000 | 1.150 | 0.142 | 0.013 | 0.013 |
| 1.2500 | 0.947 | 0.140 | 0.014 | 0.012 |
| 0.6250 | 0.668 | 0.120 | 0.014 | 0.005 |
| 0.3125 | 0.388 | 0.077 | 0.012 | 0.001 |
| 0.1563 | 0.181 | 0.041 | 0.014 | 0.006 |
| 0.0781 | 0.075 | 0.016 | 0.014 | 0.003 |
| 0.0391 | 0.024 | 0.005 | 0.016 | 0.011 |

The negative control did not show any significant change in signal upon exposure to saccharin, and the signal did not increase or decrease together with the saccharin concentration, demonstrating the absence of agonist-induced receptor activation. The $EC_{50}$ was calculated as described in example 3. The calculated $EC_{50}$ value for saccharin and TAS2R44 was 0.65±0.02 mM.

Examples 5 to 10

Each sample (receptors as well as controls) contained a final concentration of 0.02% DMSO to allow for comparability of all examples below.

Example 5

Activation of TAS2R44 by Sucralose

The intracellular calcium response following addition of sucralose was determined in HEK293T cell line stably expressing Gα16-gustducin44 and TAS2R44 formed as described in example 2a.

As a negative control to determine unspecific signals, each of the applied concentrations of sucralose was applied to cells expressing only Gα16gustducin44. The results are shown in Table 2 below.

TABLE 2

Activation of TAS2R44 by different concentrations of sucralose ($\Delta F/F0$ values +/− STD)

| Sucralose [mM] | TAS2R44 $\Delta F/F_0$ | TAS2R44 ± STD | Neg. Control $\Delta F/F_0$ | Neg. Control ± STD |
|---|---|---|---|---|
| 100.0000 | 0.260 | 0.039 | 0.021 | 0.012 |
| 50.0000 | 0.256 | 0.065 | 0.018 | 0.016 |
| 25.0000 | 0.197 | 0.050 | 0.016 | 0.017 |
| 12.5000 | 0.109 | 0.022 | 0.016 | 0.014 |
| 6.2500 | 0.059 | 0.001 | 0.017 | 0.009 |
| 3.1250 | 0.043 | 0.003 | 0.012 | 0.001 |
| 1.5625 | 0.026 | 0.006 | 0.017 | 0.008 |
| 0.7813 | 0.025 | 0.008 | 0.014 | 0.002 |
| 0.3906 | 0.023 | 0.006 | 0.014 | 0.002 |

A significant increase in calcium signaling was observed upon addition of sucralose in cells stably expressing human TAS2R44. No significant change was seen in the negative control, which is the host cells expressing only the $G\alpha16$-gustducin44. This shows the specificity of sucralose as a TAS2R44 agonist.

The calculated $EC_{50}$ value was 16.69±1.01 mM for sucralose and TAS2R44. The results demonstrate that TAS2R44 is activated by sucralose. A comparison to the EC50 of saccharin (example 4) show that sucralose is a somewhat less potent agonist than saccharin.

Furthermore, cyclamate and aspartame, sweeteners with a known bitter off-note, were also tested and found not to be agonists for TAS2R44, further indicating the highly specific receptor activation by sucralose.

Example 6

Activation of TAS2R1 by Sucralose

The intracellular calcium response following addition of sucralose was determined in HEK293T cell line stably expressing $G\alpha16$-gustducin44 and TAS2R1 formed as described in example 2c.

The results are shown in Table 3 below.

TABLE 3

Activation of TAS2R1 by different concentrations of sucralose ($\Delta F/F0$ values +/− STD)

| Sucralose [mM] | TAS2R1 $\Delta F/F_0$ | TAS2R1 ± STD |
|---|---|---|
| 100.0000 | 0.518 | 0.111 |
| 50.0000 | 0.197 | 0.041 |
| 25.0000 | 0.104 | 0.015 |
| 12.5000 | 0.072 | 0.013 |
| 6.2500 | 0.061 | 0.015 |
| 3.1250 | 0.059 | 0.015 |
| 1.5625 | 0.047 | 0.012 |
| 0.7813 | 0.050 | 0.013 |
| 0.3906 | 0.052 | 0.013 |

A significant concentration-dependent increase in calcium signaling was observed upon addition of sucralose in cells stably expressing human TAS2R1. The results demonstrate that TAS2R1 is activated by sucralose.

Example 7

Activation of TAS2R10 by Sucralose

The intracellular calcium response following addition of sucralose was determined in HEK293T cell line stably expressing $G\alpha16$-gustducin44 and TAS2R1 formed as described in example 2a.

The results are shown in Table 4 below.

TABLE 4

Activation of TAS2R10 by different concentrations of sucralose ($\Delta F/F0$ values +/− STD)

| Sucralose [mM] | TAS2R10 $\Delta F/F_0$ | TAS2R10 ± STD |
|---|---|---|
| 100.0000 | 0.437 | 0.188 |
| 50.0000 | 0.212 | 0.101 |
| 25.0000 | 0.087 | 0.031 |
| 12.5000 | 0.059 | 0.006 |
| 6.2500 | 0.053 | 0.006 |
| 3.1250 | 0.053 | 0.010 |
| 1.5625 | 0.047 | 0.008 |
| 0.7813 | 0.050 | 0.007 |
| 0.3906 | 0.050 | 0.006 |

A significant concentration-dependent increase in calcium signaling was observed upon addition of sucralose in cells stably expressing human TAS2R10. The results demonstrate that TAS2R10 is activated by sucralose.

Example 8

Activation of TAS2R46 by Sucralose

The intracellular calcium response following addition of sucralose was determined in HK293T cell line stably expressing $G\alpha16$-gustducin44 and transiently expressing TAS2R46 formed as described in example 2b.

The results are shown in Table 5 below.

TABLE 5

Activation of TAS2R46 by different concentrations of sucralose ($\Delta F/F0$ values +/− STD)

| Sucralose [mM] | TAS2R46 $\Delta F/F_0$ | TAS2R46 ± STD |
|---|---|---|
| 100.0000 | 0.258 | 0.066 |
| 50.0000 | 0.171 | 0.047 |
| 25.0000 | 0.106 | 0.021 |
| 12.5000 | 0.075 | 0.020 |
| 6.2500 | 0.057 | 0.022 |
| 3.1250 | 0.036 | 0.013 |
| 1.5625 | 0.035 | 0.011 |
| 0.7813 | 0.038 | 0.009 |
| 0.3906 | 0.041 | 0.011 |

A significant concentration-dependent increase in calcium signaling was observed upon addition of sucralose in cells stably expressing human TAS2R46. The results demonstrate that TAS2R46 is activated by sucralose.

Example 9

Identification of Antagonists of the Response of TAS2R44 to Sucralose

All cells were HEK293T cells stably expressing $G\alpha16$-gustducin44, or expressing $G\alpha16$-gustducin44 and a TAS2R receptor (TAS2R44, TAS2R16).

The method was carried out as described in example 3 subject to the following modifications: The samples were tested with and without test compound A (test cpd A) and the signals were compared. The test compound was dissolved in dimethylsulfoxide (DMSO), and a negative control with equivalent DMSO concentration (0.02%) was performed accordingly to exclude a potential inhibitory effect of the solvent.

Furthermore, a control with sucralose and DMSO (0.02%) was performed accordingly (see table in example 5).

Test compound A (a candidate blocking compound) was (E)-4-(2,2,3-trimethylcyclopent-3-enyl)but-2-enoic acid, the chemical formula is shown below.

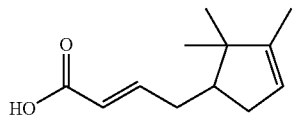

All data was calculated as $\Delta F/F_0$ and the standard deviation (STD) of two independent runs of the experiment with each run performed in triplicate is indicated in each table (see results in Table 6 herein below).

TABLE 6

Response of TAS2R44 expressing cells to sucralose alone or in the presence of 25 μM test cpd A or negative control

| Sucralose concentration [mM] | Sucralose + test cpd A $\Delta F/F_0$ | ±STD | Sucralose $\Delta F/F_0$ | ±STD |
|---|---|---|---|---|
| 100.0000 | 0.107 | 0.014 | 0.352 | 0.030 |
| 50.0000 | −0.025 | 0.006 | 0.192 | 0.011 |
| 25.0000 | −0.035 | 0.002 | 0.110 | 0.019 |
| 12.5000 | −0.015 | 0.000 | 0.051 | 0.004 |
| 6.2500 | 0.000 | 0.006 | 0.027 | 0.029 |
| 3.1250 | 0.005 | 0.002 | 0.030 | 0.042 |
| 1.5625 | 0.016 | 0.004 | 0.042 | 0.039 |
| 0.7813 | 0.010 | 0.001 | 0.038 | 0.042 |
| 0.3906 | 0.011 | 0.002 | 0.046 | 0.048 |

The 0.02% DMSO negative control (see results in the table above) did not show an inhibitory effect, demonstrating that the detected inhibition is caused by test cpd A and not by the solvent (0.02% DMSO).

As a negative control, each agonist and each agonist with the antagonist/test compound (test cpd A) is applied to cells expressing only Gα16gustducin44 but no TAS2 receptor (see results in table 7 herein below).

TABLE 7

Response of cells without bitter receptor to sucralose, either alone or in the presence of 25 μM test cpd A (E)-4-(2,2,3-trimethylcyclopent-3-enyl)but-2-enoic acid.

| Sucralose concentration [mM] | Sucralose + test cpd A $\Delta F/F_0$ | ±STD | Sucralose $\Delta F/F_0$ | ±STD |
|---|---|---|---|---|
| 100.0000 | −0.175 | 0.026 | −0.179 | 0.023 |

The results for the negative control (agonists applied to cells expressing only Gα16gustducin44 but no TAS2 receptor, see results in the table above) demonstrate the specificity of the inhibition of TAS2R44 by test cpd A.

As a control of antagonist specificity, the response of an unrelated bitter taste receptor (TAS2R16) to its agonist phenyl-β-glucopyranosides is also detected (see results in table 8 herein below).

TABLE 8

Response of cells expressing TAS2R16 to P-β-G either alone or in the presence of 25 μM of test cpd A (E)-4-(2,2,3-trimethylcyclopent-3-enyl)but-2-enoic acid.

| P-β-G concentration [mM] | P-β-G + test cpd A $\Delta F/F_0$ | ±STD | P-β-G $\Delta F/F_0$ | ±STD |
|---|---|---|---|---|
| 10.0000 | 2.830 | 0.213 | 2.876 | 0.197 |
| 5.0000 | 2.646 | 0.228 | 2.693 | 0.216 |
| 2.5000 | 2.480 | 0.191 | 2.578 | 0.172 |
| 1.2500 | 2.367 | 0.188 | 2.361 | 0.152 |
| 0.6250 | 2.139 | 0.101 | 2.284 | 0.129 |
| 0.3125 | 1.548 | 0.112 | 1.810 | 0.171 |
| 0.1563 | 0.702 | 0.049 | 0.926 | 0.126 |
| 0.0781 | 0.108 | 0.026 | 0.213 | 0.053 |
| 0.0391 | −0.013 | 0.001 | 0.012 | 0.027 |

The results in table 8 above show that test cpd A does not block the response of an unrelated bitter taste receptor (TAS2R16) to its agonist phenyl-β-glucopyranoside, serving as a control of antagonist specificity. SABTR agonist/test cpd A does not inhibit the agonist of TAS2R16, the sucrose (TAS2R44 agonist) inhibition by test cpd A is therefore shown to be specific.)

EC50 values were calculated as described in example 3. As agonist, sucralose was used for TAS2R44, and Phenyl-6-glucopyranoside was used for TAS2R16. The results are shown in the table 9 below.

TABLE 9

$EC_{50}$ values for cells stably expressing TAS2R16 or TAS2R44 for their known agonist (P-β-G for TAS2R16 or sucralose for TAS2R44) in the presence or absence of 25 microM of test cpd A

| | $EC_{50}$ Agonist [mM] + 25 μM test cpd A | $EC_{50}$ Agonist [mM] |
|---|---|---|
| TAS2R44 | No response | 36.3 ± 5.7 |
| TAS2R16 | 0.25 ± 0.02 | 0.21 ± 0.02 |

In order to exclude that the response to the test compound is an unspecific effect, all experiments were also performed in the presence of test compound B (4-(2,2,3-trimethylcyclopentyl)butanamide), see chemical structure shown below, which has a similar chemical structure as test cpd A ((E)-4-(2,2,3-trimethylcyclopent-3-enyl)but-2-enoic acid).

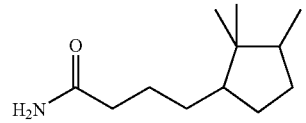

The addition of test cpd B at 25 μM had no effect on the response of TAS2R44 to sucralose, did not elicit a response in cells not expressing TAS2R44 (negative control), and did not effect the response of TAS2R16 to phenyl-β-glucopyranoside. The addition of test cpd B had no effect on the EC50 value.

The results in table 9 show that the response of TAS2R44 to different concentrations of sucralose is inhibited by 25 μM (E)-4-(2,2,3-trimethylcyclopent-3-enyl)but-2-enoic acid. TAS2R16 with no signal shows the specificity of the inhibition by the test compound.

The controls in tables 6, 7, and 8 above demonstrated that the inhibitory effect of test cpd A on TAS2R44 is specific.

Example 10

Sensory Evaluation

The bitter blocking capability of test cpd A (13 ppm) in sucralose (3 mM) solution was evaluated.

Twenty ml of each solution (sucralose or sucralose with test cpd A) was presented in random order to 15 bitter-sensitive panelists. In two replications, panelists were asked to select the solution they perceived as more bitter. A beta-binomial analysis was calculated from the forced-choice data to correct for overdispersion.

A significant (p<0.05) majority of evaluations (22 of 30) selected test cpd A (13 ppm) in a 3 mM sucralose solution as being less bitter than a 3 mM sucralose solution. This is equivalent to a significant d' of 0.88±0.12.

Because panelists evaluated bitterness over 2 replications, the data was subjected to a beta-binomial d' analysis to determine whether over-dispersion occurred. Not accounting for over-dispersion has the potential to underestimate the significance level at which a test is conducted and therefore lead to false-positive results. The analysis refuted overdispersion (gamma=0.00; p=0.109) and no adjustments were necessary.

The data showed that test cpd A (13 ppm) reduced the perceived bitterness of 3 mM sucralose solutions.

While the kit and methods have been described above in connection with illustrative embodiments, it is to be understood that other similar embodiments may be used or modifications and additions may be made to the described embodiments for performing the same function without deviating therefrom. Further, all embodiments disclosed are not necessarily in the alternative, as various embodiments of the invention may be combined to provide the desired characteristics. Variations can be made by one having ordinary skill in the art without departing from the spirit and scope of the invention. Therefore, the kit and methods should not be limited to any single embodiment, but rather construed in breadth and scope in accordance with the recitation of the attached claims.

---

The invention claimed is:

1. A method to identify an agent that modulates the taste of sucralose comprising:
   (i) contacting cells that express a TAS2R bitter taste receptor that is able to be activated by sucralose with sucralose in the presence of at least one agent; and
   (ii) determining whether the at least one agent affects binding to sucralose or a functional response thereto of said TAS2R bitter taste receptor,
   wherein said TAS2R bitter taste receptor comprises a polypeptide having at least 90% sequence identity to SEQ ID NO: 2, with the proviso that the cells are not unmanipulated cells in their natural environment.

2. The method of claim 1, wherein the TAS2R bitter taste receptor comprises a conservative functional variant able to be activated by sucralose.

3. The method of claim 1 or 2, wherein the cells also express a G-Protein, optionally a chimeric G-protein substantially homologous to Gaq-Gustducin, or the chimeric G-protein G alpha 16-gustducin 44.

4. The method of claim 1 or 2, wherein step (ii) comprises measuring a change in or caused by intracellular messengers.

5. The method of claim 1 or 2, comprising determining the functional response by measuring a change in an intracellular messenger selected from IP3 and calcium$^{2+}$.

6. The method of claim 1 or 2, wherein said cells are selected from the group consisting of eucaryotic cells, yeast cells, insect cells, mammalian cells, amphibian cells, worm cells and combinations thereof.

7. The method of claim 6, wherein the cell comprises a mammalian cell.

8. The method of claim 7, wherein the cell comprises a mammalian cell selected from the group consisting of CHO, COS, HeLa, HEK-293 cells and combinations thereof.

9. The method of claim 1 or 2, wherein step (i) further comprises contacting the TAS2R bitter taste receptor with a test agent in presence of calcium, optionally in the form of calcium chloride.

10. A kit comprising:
    (i) recombinant cells that express a TAS2R bitter taste receptor comprising a polypeptide having at least 90% sequence identity to SEQ ID NO: 2; and
    (ii) sucralose,
for combined use to identify test agents as modulators of the taste of sucralose.

11. A method of using the kit of claim 10, comprising:
    (i) growing said recombinant cells that express a TAS2R bitter taste receptor comprising a polypeptide having at least 90% sequence identity to SEQ ID NO: 2 as determined by sequence identity,
    (ii) adding at least one test agent in the presence of sucralose in a suitable concentration, and
    (iii) determining a change in a functional response of the cells by comparing the response in presence and absence of the test agent, to identify test agents that modulate the taste of sucralose.

12. A method to identify an agent that modulates a TAS2R bitter taste receptor comprising a polypeptide having at least 90% sequence identity to SEQ ID NO: 2 as determined by sequence identity, the method comprising:
    (i) measuring a parameter that changes in response to sucralose binding to the TAS2R bitter taste receptor, and
    (ii) determining a change of the parameter in response to a test agent, in comparison to a negative control and thereby identifying a modulator of the taste of sucralose.

13. The method according to claim 12 wherein step (i) is performed by a method selected from the group consisting of fluorescence spectroscopy, NMR spectroscopy, measuring of one or more of absorbance, refractive index, hydrodynamic methods, chromatography, measuring solubility, biochemical methods, wherein the methods measure the properties of the TAS2R bitter taste receptor in a suitable environment selected from the group consisting of solution, bilayer membrane, attached to a solid phase, in a lipid monolayer, bound on a membrane, and in vesicles.

* * * * *

SEQUENCE LISTING

```
<160> NUMBER OF SEQ ID NOS: 14

<210> SEQ ID NO 1
<211> LENGTH: 930
<212> TYPE: DNA
<213> ORGANISM: Homo sapiens
<220> FEATURE:
<221> NAME/KEY: CDS
<222> LOCATION: (1)..(930)

<400> SEQUENCE: 1 atg aca act ttt ata ccc atc att ttt tcc agt gtg gta gtg gtt cta      48
Met Thr Thr Phe Ile Pro Ile Ile Phe Ser Ser Val Val Val Val Leu
1               5                   10                  15 ttt gtt att gga aat ttt gct aat ggc ttc ata gca ttg gta aat tcc      96
Phe Val Ile Gly Asn Phe Ala Asn Gly Phe Ile Ala Leu Val Asn Ser
            20                  25                  30 att gag cgg gtc aag aga caa aag atc tct ttt gct gac cag att ctc     144
Ile Glu Arg Val Lys Arg Gln Lys Ile Ser Phe Ala Asp Gln Ile Leu
        35                  40                  45 act gct ctg gcg gtc tcc aga gtt ggt ttg ctc tgg gta tta tta tta     192
Thr Ala Leu Ala Val Ser Arg Val Gly Leu Leu Trp Val Leu Leu Leu
    50                  55                  60 aat tgg tat tca act gtg ttt aat cca gct ttt tat agt gta gaa gta     240
Asn Trp Tyr Ser Thr Val Phe Asn Pro Ala Phe Tyr Ser Val Glu Val
65                  70                  75                  80 aga act act gct tat aat gtc tgg gca gta acc ggc cat ttc agc aac     288
Arg Thr Thr Ala Tyr Asn Val Trp Ala Val Thr Gly His Phe Ser Asn
                85                  90                  95 tgg ctt gct act agc ctc agc ata ttt tat ttg ctc aag att gcc aat     336
Trp Leu Ala Thr Ser Leu Ser Ile Phe Tyr Leu Leu Lys Ile Ala Asn
            100                 105                 110 ttc tcc aac ctt att ttt ctt cac tta aag agg aga gtt aag agt gtc     384
Phe Ser Asn Leu Ile Phe Leu His Leu Lys Arg Arg Val Lys Ser Val
        115                 120                 125 att ctg gtg atg ctg ttg ggg cct tta cta ttt ttg gct tgt caa ctt     432
Ile Leu Val Met Leu Leu Gly Pro Leu Leu Phe Leu Ala Cys Gln Leu
    130                 135                 140 ttt gta ata aac atg aaa gag att gta cgg aca aaa gaa tat gaa gga     480
Phe Val Ile Asn Met Lys Glu Ile Val Arg Thr Lys Glu Tyr Glu Gly
145                 150                 155                 160 aac ttg act tgg aag atc aaa ttg agg agt gca gtg tac ctt tca gat     528
```

```
Asn Leu Thr Trp Lys Ile Lys Leu Arg Ser Ala Val Tyr Leu Ser Asp
            165                 170                 175 gcg act gta acc acg cta gga aac tta gtg ccc ttc act ctg acc ctg     576
Ala Thr Val Thr Thr Leu Gly Asn Leu Val Pro Phe Thr Leu Thr Leu
            180                 185                 190 cta tgt ttt ttg cta atc tgt tct ctg tgt aaa cat ctc aag aag         624
Leu Cys Phe Leu Leu Ile Cys Ser Leu Cys Lys His Leu Lys Lys
            195                 200                 205 atg cag ctc cat ggt aaa gga tct caa gat ccc agc acc aag gtc cac     672
Met Gln Leu His Gly Lys Gly Ser Gln Asp Pro Ser Thr Lys Val His
            210                 215                 220 ata aaa gct ttg caa act gtg atc ttt ttc ctc ttg tta tgt gcc gtt     720
Ile Lys Ala Leu Gln Thr Val Ile Phe Phe Leu Leu Cys Ala Val
225                 230                 235                 240 tac ttt ctg tcc ata atg ata tca gtt tgg agt ttt ggg agt ctg gaa     768
Tyr Phe Leu Ser Ile Met Ile Ser Val Trp Ser Phe Gly Ser Leu Glu
            245                 250                 255 aac aaa cct gtc ttc atg ttc tgc aaa gct att aga ttc agc tat cct     816
Asn Lys Pro Val Phe Met Phe Cys Lys Ala Ile Arg Phe Ser Tyr Pro
            260                 265                 270 tca atc cac cca ttc atc ctg att tgg gga aac aag aag cta aag cag     864
Ser Ile His Pro Phe Ile Leu Ile Trp Gly Asn Lys Lys Leu Lys Gln
            275                 280                 285 act ttt ctt tca gtt ttg cgg caa gtg agg tac tgg gtg aaa gga gag     912
Thr Phe Leu Ser Val Leu Arg Gln Val Arg Tyr Trp Val Lys Gly Glu
            290                 295                 300 aag cct tca tct cca tag                                             930
Lys Pro Ser Ser Pro
305

<210> SEQ ID NO 2
<211> LENGTH: 309
<212> TYPE: PRT
<213> ORGANISM: Homo sapiens

<400> SEQUENCE: 2

Met Thr Thr Phe Ile Pro Ile Ile Phe Ser Ser Val Val Val Leu
1               5                   10                  15

Phe Val Ile Gly Asn Phe Ala Asn Gly Phe Ile Ala Leu Val Asn Ser
            20                  25                  30

Ile Glu Arg Val Lys Arg Gln Lys Ile Ser Phe Ala Asp Gln Ile Leu
            35                  40                  45

Thr Ala Leu Ala Val Ser Arg Val Gly Leu Leu Trp Val Leu Leu Leu
        50                  55                  60

Asn Trp Tyr Ser Thr Val Phe Asn Pro Ala Phe Tyr Ser Val Glu Val
65              70                  75                  80

Arg Thr Thr Ala Tyr Asn Val Trp Ala Val Thr Gly His Phe Ser Asn
                85                  90                  95

Trp Leu Ala Thr Ser Leu Ser Ile Phe Tyr Leu Leu Lys Ile Ala Asn
            100                 105                 110

Phe Ser Asn Leu Ile Phe Leu His Leu Lys Arg Arg Val Lys Ser Val
            115                 120                 125

Ile Leu Val Met Leu Leu Gly Pro Leu Leu Phe Leu Ala Cys Gln Leu
        130                 135                 140

Phe Val Ile Asn Met Lys Glu Ile Val Arg Thr Lys Glu Tyr Glu Gly
145                 150                 155                 160

Asn Leu Thr Trp Lys Ile Lys Leu Arg Ser Ala Val Tyr Leu Ser Asp
            165                 170                 175
```

```
Ala Thr Val Thr Thr Leu Gly Asn Leu Val Pro Phe Thr Leu Thr Leu
            180                 185                 190

Leu Cys Phe Leu Leu Leu Ile Cys Ser Leu Cys Lys His Leu Lys Lys
            195                 200                 205

Met Gln Leu His Gly Lys Gly Ser Gln Asp Pro Ser Thr Lys Val His
210                 215                 220

Ile Lys Ala Leu Gln Thr Val Ile Phe Phe Leu Leu Cys Ala Val
225                 230                 235                 240

Tyr Phe Leu Ser Ile Met Ile Ser Val Trp Ser Phe Gly Ser Leu Glu
                245                 250                 255

Asn Lys Pro Val Phe Met Phe Cys Lys Ala Ile Arg Phe Ser Tyr Pro
            260                 265                 270

Ser Ile His Pro Phe Ile Leu Ile Trp Gly Asn Lys Lys Leu Lys Gln
        275                 280                 285

Thr Phe Leu Ser Val Leu Arg Gln Val Arg Tyr Trp Val Lys Gly Glu
    290                 295                 300

Lys Pro Ser Ser Pro
305

<210> SEQ ID NO 3
<211> LENGTH: 900
<212> TYPE: DNA
<213> ORGANISM: Homo sapiens
<220> FEATURE:
<221> NAME/KEY: CDS
<222> LOCATION: (1)..(900)

<400> SEQUENCE: 3 atg cta gag tct cac ctc att atc tat ttt ctt ctt gca gtg ata caa    48
Met Leu Glu Ser His Leu Ile Ile Tyr Phe Leu Leu Ala Val Ile Gln
1               5                   10                  15 ttt ctt ctt ggg att ttc aca aat ggc atc att gtg gtg gtg aat ggc    96
Phe Leu Leu Gly Ile Phe Thr Asn Gly Ile Ile Val Val Val Asn Gly
            20                  25                  30 att gac ttg atc aag cac aga aaa atg gct ccg ctg gat ctc ctt ctt    144
Ile Asp Leu Ile Lys His Arg Lys Met Ala Pro Leu Asp Leu Leu Leu
        35                  40                  45 tct tgt ctg gca gtt tct aga att ttt ctg cag ttg ttc atc ttc tac    192
Ser Cys Leu Ala Val Ser Arg Ile Phe Leu Gln Leu Phe Ile Phe Tyr
    50                  55                  60 gtt aat gtg att gtt atc ttc ttc ata gaa ttc atc atg tgt tct gcg    240
Val Asn Val Ile Val Ile Phe Phe Ile Glu Phe Ile Met Cys Ser Ala
65                  70                  75                  80 aat tgt gca att ctc tta ttt ata aat gaa ttg gaa ctt tgg ctt gcc    288
Asn Cys Ala Ile Leu Leu Phe Ile Asn Glu Leu Glu Leu Trp Leu Ala
                85                  90                  95 aca tgg ctc ggc gtt ttc tat tgt gcc aag gtt gcc agc gtc cgt cac    336
Thr Trp Leu Gly Val Phe Tyr Cys Ala Lys Val Ala Ser Val Arg His
            100                 105                 110 cca ctc ttc atc tgg ttg aag atg agg ata tcc aag ctg gtc cca tgg    384
Pro Leu Phe Ile Trp Leu Lys Met Arg Ile Ser Lys Leu Val Pro Trp
        115                 120                 125 atg atc ctg ggg tct ctg cta tat gta tct atg att tgt gtt ttc cat    432
Met Ile Leu Gly Ser Leu Leu Tyr Val Ser Met Ile Cys Val Phe His
    130                 135                 140 agc aaa tat gca ggg ttt atg gtc cca tac ttc cta agg aaa ttt ttc    480
Ser Lys Tyr Ala Gly Phe Met Val Pro Tyr Phe Leu Arg Lys Phe Phe
145                 150                 155                 160 tcc caa aat gcc aca att caa aaa gaa gat aca ctg gct ata cag att    528
Ser Gln Asn Ala Thr Ile Gln Lys Glu Asp Thr Leu Ala Ile Gln Ile
```

```
                     165                 170                 175
ttc tct ttt gtt gct gag ttc tca gtg cca ttg ctt atc ttc ctt ttt    576
Phe Ser Phe Val Ala Glu Phe Ser Val Pro Leu Leu Ile Phe Leu Phe
        180                 185                 190 gct gtt ttg ctc ttg att ttc tct ctg ggg agg cac acc cgg caa atg    624
Ala Val Leu Leu Leu Ile Phe Ser Leu Gly Arg His Thr Arg Gln Met
    195                 200                 205 aga aac aca gtg gcc ggc agc agg gtt cct ggc agg ggt gca ccc atc    672
Arg Asn Thr Val Ala Gly Ser Arg Val Pro Gly Arg Gly Ala Pro Ile
210                 215                 220 agc gcg ttg ctg tct atc ctg tcc ttc ctg atc ctc tac ttc tcc cac    720
Ser Ala Leu Leu Ser Ile Leu Ser Phe Leu Ile Leu Tyr Phe Ser His
225                 230                 235                 240 tgc atg ata aaa gtt ttt ctc tct tct cta aag ttt cac atc aga agg    768
Cys Met Ile Lys Val Phe Leu Ser Ser Leu Lys Phe His Ile Arg Arg
            245                 250                 255 ttc atc ttt ctg ttc ttc atc ctt gtg att ggt ata tac cct tct gga    816
Phe Ile Phe Leu Phe Phe Ile Leu Val Ile Gly Ile Tyr Pro Ser Gly
        260                 265                 270 cac tct ctc atc tta att tta gga aat cct aaa ttg aaa caa aat gca    864
His Ser Leu Ile Leu Ile Leu Gly Asn Pro Lys Leu Lys Gln Asn Ala
    275                 280                 285 aaa aag ttc ctc ctc cac agt aag tgc tgt cag tga                    900
Lys Lys Phe Leu Leu His Ser Lys Cys Cys Gln
290                 295
```

<210> SEQ ID NO 4
<211> LENGTH: 299
<212> TYPE: PRT
<213> ORGANISM: Homo sapiens

<400> SEQUENCE: 4

```
Met Leu Glu Ser His Leu Ile Ile Tyr Phe Leu Leu Ala Val Ile Gln
1               5                   10                  15

Phe Leu Leu Gly Ile Phe Thr Asn Gly Ile Ile Val Val Val Asn Gly
            20                  25                  30

Ile Asp Leu Ile Lys His Arg Lys Met Ala Pro Leu Asp Leu Leu Leu
        35                  40                  45

Ser Cys Leu Ala Val Ser Arg Ile Phe Leu Gln Leu Phe Ile Phe Tyr
    50                  55                  60

Val Asn Val Ile Val Ile Phe Phe Ile Glu Phe Ile Met Cys Ser Ala
65                  70                  75                  80

Asn Cys Ala Ile Leu Leu Phe Ile Asn Glu Leu Glu Leu Trp Leu Ala
                85                  90                  95

Thr Trp Leu Gly Val Phe Tyr Cys Ala Lys Val Ala Ser Val Arg His
            100                 105                 110

Pro Leu Phe Ile Trp Leu Lys Met Arg Ile Ser Lys Leu Val Pro Trp
        115                 120                 125

Met Ile Leu Gly Ser Leu Leu Tyr Val Ser Met Ile Cys Val Phe His
    130                 135                 140

Ser Lys Tyr Ala Gly Phe Met Val Pro Tyr Phe Leu Arg Lys Phe Phe
145                 150                 155                 160

Ser Gln Asn Ala Thr Ile Gln Lys Glu Asp Thr Leu Ala Ile Gln Ile
                165                 170                 175

Phe Ser Phe Val Ala Glu Phe Ser Val Pro Leu Leu Ile Phe Leu Phe
            180                 185                 190

Ala Val Leu Leu Leu Ile Phe Ser Leu Gly Arg His Thr Arg Gln Met
        195                 200                 205
```

```
Arg Asn Thr Val Ala Gly Ser Arg Val Pro Gly Arg Gly Ala Pro Ile
    210                 215                 220

Ser Ala Leu Leu Ser Ile Leu Ser Phe Leu Ile Leu Tyr Phe Ser His
225                 230                 235                 240

Cys Met Ile Lys Val Phe Leu Ser Ser Leu Lys Phe His Ile Arg Arg
                245                 250                 255

Phe Ile Phe Leu Phe Phe Ile Leu Val Ile Gly Ile Tyr Pro Ser Gly
                260                 265                 270

His Ser Leu Ile Leu Ile Leu Gly Asn Pro Lys Leu Lys Gln Asn Ala
            275                 280                 285

Lys Lys Phe Leu Leu His Ser Lys Cys Cys Gln
    290                 295

<210> SEQ ID NO 5
<211> LENGTH: 924
<212> TYPE: DNA
<213> ORGANISM: Homo sapiens
<220> FEATURE:
<221> NAME/KEY: CDS
<222> LOCATION: (1)..(924)

<400> SEQUENCE: 5
```

| | | | | | | | | | | | | | | | | |
|---|---|---|---|---|---|---|---|---|---|---|---|---|---|---|---|---|
| atg | cta | cgt | gta | gtg | gaa | ggc | atc | ttc | att | ttt | gtt | gta | gtt | agt | gag | 48 |
| Met | Leu | Arg | Val | Val | Glu | Gly | Ile | Phe | Ile | Phe | Val | Val | Val | Ser | Glu | |
| 1 | | | | 5 | | | | | 10 | | | | | 15 | | |
| tca | gtg | ttt | ggg | gtt | ttg | ggg | aat | gga | ttt | att | gga | ctt | gta | aac | tgc | 96 |
| Ser | Val | Phe | Gly | Val | Leu | Gly | Asn | Gly | Phe | Ile | Gly | Leu | Val | Asn | Cys | |
| | | | 20 | | | | | 25 | | | | | 30 | | | |
| att | gac | tgt | gcc | aag | aat | aag | tta | tct | acg | att | ggc | ttt | att | ctc | acc | 144 |
| Ile | Asp | Cys | Ala | Lys | Asn | Lys | Leu | Ser | Thr | Ile | Gly | Phe | Ile | Leu | Thr | |
| | | 35 | | | | | 40 | | | | | 45 | | | | |
| ggc | tta | gct | att | tca | aga | att | ttt | ctg | ata | tgg | ata | ata | att | aca | gat | 192 |
| Gly | Leu | Ala | Ile | Ser | Arg | Ile | Phe | Leu | Ile | Trp | Ile | Ile | Ile | Thr | Asp | |
| | 50 | | | | | 55 | | | | | 60 | | | | | |
| gga | ttt | ata | cag | ata | ttc | tct | cca | aat | ata | tat | gcc | tcc | ggt | aac | cta | 240 |
| Gly | Phe | Ile | Gln | Ile | Phe | Ser | Pro | Asn | Ile | Tyr | Ala | Ser | Gly | Asn | Leu | |
| 65 | | | | | 70 | | | | | 75 | | | | | 80 | |
| att | gaa | tat | att | agt | tac | ttt | tgg | gta | att | ggt | aat | caa | tca | agt | atg | 288 |
| Ile | Glu | Tyr | Ile | Ser | Tyr | Phe | Trp | Val | Ile | Gly | Asn | Gln | Ser | Ser | Met | |
| | | | | 85 | | | | | 90 | | | | | 95 | | |
| tgg | ttt | gcc | acc | agc | ctc | agc | atc | ttc | tat | ttc | ctg | aag | ata | gca | aat | 336 |
| Trp | Phe | Ala | Thr | Ser | Leu | Ser | Ile | Phe | Tyr | Phe | Leu | Lys | Ile | Ala | Asn | |
| | | | 100 | | | | | 105 | | | | | 110 | | | |
| ttt | tcc | aac | tac | ata | ttt | ctc | tgg | ttg | aag | agc | aga | aca | aat | atg | gtt | 384 |
| Phe | Ser | Asn | Tyr | Ile | Phe | Leu | Trp | Leu | Lys | Ser | Arg | Thr | Asn | Met | Val | |
| | | 115 | | | | | 120 | | | | | 125 | | | | |
| ctt | ccc | ttc | atg | ata | gta | ttc | tta | ctt | att | tca | tcg | tta | ctt | aat | ttt | 432 |
| Leu | Pro | Phe | Met | Ile | Val | Phe | Leu | Leu | Ile | Ser | Ser | Leu | Leu | Asn | Phe | |
| | 130 | | | | | 135 | | | | | 140 | | | | | |
| gca | tac | att | gcg | aag | att | ctt | aat | gat | tat | aaa | acg | aag | aat | gac | aca | 480 |
| Ala | Tyr | Ile | Ala | Lys | Ile | Leu | Asn | Asp | Tyr | Lys | Thr | Lys | Asn | Asp | Thr | |
| 145 | | | | | 150 | | | | | 155 | | | | | 160 | |
| gtc | tgg | gat | ctc | aac | atg | tat | aaa | agt | gaa | tac | ttt | att | aaa | cag | att | 528 |
| Val | Trp | Asp | Leu | Asn | Met | Tyr | Lys | Ser | Glu | Tyr | Phe | Ile | Lys | Gln | Ile | |
| | | | | 165 | | | | | 170 | | | | | 175 | | |
| ttg | cta | aat | ctg | gga | gtc | att | ttc | ttc | ttt | aca | cta | tcc | cta | att | aca | 576 |
| Leu | Leu | Asn | Leu | Gly | Val | Ile | Phe | Phe | Phe | Thr | Leu | Ser | Leu | Ile | Thr | |
| | | | 180 | | | | | 185 | | | | | 190 | | | |
| tgt | att | ttt | tta | atc | att | tcc | ctt | tgg | aga | cac | aac | agg | cag | atg | caa | 624 |
| Cys | Ile | Phe | Leu | Ile | Ile | Ser | Leu | Trp | Arg | His | Asn | Arg | Gln | Met | Gln | |

```
                 195                 200                  205
tcg aat gtg aca gga ttg aga gac tcc aac aca gaa gct cat gtg aag       672
Ser Asn Val Thr Gly Leu Arg Asp Ser Asn Thr Glu Ala His Val Lys
210                 215                 220 gca atg aaa gtt ttg ata tct ttc atc atc ctc ttt atc ttg tat ttt       720
Ala Met Lys Val Leu Ile Ser Phe Ile Ile Leu Phe Ile Leu Tyr Phe
225                 230                 235                 240 ata ggc atg gcc ata gaa ata tca tgt ttt act gtg cga gaa aac aaa       768
Ile Gly Met Ala Ile Glu Ile Ser Cys Phe Thr Val Arg Glu Asn Lys
            245                 250                 255 ctg ctg ctt atg ttt gga atg aca acc aca gcc atc tat ccc tgg ggt       816
Leu Leu Leu Met Phe Gly Met Thr Thr Thr Ala Ile Tyr Pro Trp Gly
        260                 265                 270 cac tca ttt atc tta att cta gga aac agc aag cta aag caa gcc tct       864
His Ser Phe Ile Leu Ile Leu Gly Asn Ser Lys Leu Lys Gln Ala Ser
    275                 280                 285 ttg agg gta ctg cag caa ttg aag tgc tgt gag aaa agg aaa aat ctc       912
Leu Arg Val Leu Gln Gln Leu Lys Cys Cys Glu Lys Arg Lys Asn Leu
290                 295                 300 aga gtc aca tag                                                       924
Arg Val Thr
305

<210> SEQ ID NO 6
<211> LENGTH: 307
<212> TYPE: PRT
<213> ORGANISM: Homo sapiens

<400> SEQUENCE: 6

Met Leu Arg Val Val Glu Gly Ile Phe Ile Phe Val Val Ser Glu
1               5                   10                  15

Ser Val Phe Gly Val Leu Gly Asn Gly Phe Ile Gly Leu Val Asn Cys
                20                  25                  30

Ile Asp Cys Ala Lys Asn Lys Leu Ser Thr Ile Gly Phe Ile Leu Thr
            35                  40                  45

Gly Leu Ala Ile Ser Arg Ile Phe Leu Ile Trp Ile Ile Thr Asp
50                  55                  60

Gly Phe Ile Gln Ile Phe Ser Pro Asn Ile Tyr Ala Ser Gly Asn Leu
65                  70                  75                  80

Ile Glu Tyr Ile Ser Tyr Phe Trp Val Ile Gly Asn Gln Ser Ser Met
                85                  90                  95

Trp Phe Ala Thr Ser Leu Ser Ile Phe Tyr Phe Leu Lys Ile Ala Asn
            100                 105                 110

Phe Ser Asn Tyr Ile Phe Leu Trp Leu Lys Ser Arg Thr Asn Met Val
        115                 120                 125

Leu Pro Phe Met Ile Val Phe Leu Leu Ile Ser Ser Leu Leu Asn Phe
    130                 135                 140

Ala Tyr Ile Ala Lys Ile Leu Asn Asp Tyr Lys Thr Lys Asn Asp Thr
145                 150                 155                 160

Val Trp Asp Leu Asn Met Tyr Lys Ser Glu Tyr Phe Ile Lys Gln Ile
                165                 170                 175

Leu Leu Asn Leu Gly Val Ile Phe Phe Phe Thr Leu Ser Leu Ile Thr
            180                 185                 190

Cys Ile Phe Leu Ile Ile Ser Leu Trp Arg His Asn Arg Gln Met Gln
        195                 200                 205

Ser Asn Val Thr Gly Leu Arg Asp Ser Asn Thr Glu Ala His Val Lys
    210                 215                 220
```

```
Ala Met Lys Val Leu Ile Ser Phe Ile Ile Leu Phe Ile Leu Tyr Phe
225                 230                 235                 240

Ile Gly Met Ala Ile Glu Ile Ser Cys Phe Thr Val Arg Glu Asn Lys
                245                 250                 255

Leu Leu Leu Met Phe Gly Met Thr Thr Thr Ala Ile Tyr Pro Trp Gly
            260                 265                 270

His Ser Phe Ile Leu Ile Leu Gly Asn Ser Lys Leu Lys Gln Ala Ser
        275                 280                 285

Leu Arg Val Leu Gln Gln Leu Lys Cys Cys Glu Lys Arg Lys Asn Leu
    290                 295                 300

Arg Val Thr
305

<210> SEQ ID NO 7
<211> LENGTH: 930
<212> TYPE: DNA
<213> ORGANISM: Homo sapiens
<220> FEATURE:
<221> NAME/KEY: CDS
<222> LOCATION: (1)..(930)

<400> SEQUENCE: 7 atg ata act ttt ctg ccc atc att ttt tcc att cta ata gtg gtt aca       48
Met Ile Thr Phe Leu Pro Ile Ile Phe Ser Ile Leu Ile Val Val Thr
1               5                   10                  15 ttt gtg att gga aat ttt gct aat ggc ttc ata gca ttg gta aat tcc       96
Phe Val Ile Gly Asn Phe Ala Asn Gly Phe Ile Ala Leu Val Asn Ser
                20                  25                  30 att gag tgg ttc aag aga caa aag atc tct ttt gct gac caa att ctc      144
Ile Glu Trp Phe Lys Arg Gln Lys Ile Ser Phe Ala Asp Gln Ile Leu
            35                  40                  45 act gct ctg gca gtc tcc aga gtt ggt tta ctc tgg gta tta gta tta      192
Thr Ala Leu Ala Val Ser Arg Val Gly Leu Leu Trp Val Leu Val Leu
        50                  55                  60 aat tgg tat gca act gag ttg aat cca gct ttt aac agt ata gaa gta      240
Asn Trp Tyr Ala Thr Glu Leu Asn Pro Ala Phe Asn Ser Ile Glu Val
65                  70                  75                  80 aga att act gct tac aat gtc tgg gca gta atc aac cat ttc agc aac      288
Arg Ile Thr Ala Tyr Asn Val Trp Ala Val Ile Asn His Phe Ser Asn
                85                  90                  95 tgg ctt gct act agc ctc agc ata ttt tat ttg ctc aag att gcc aat      336
Trp Leu Ala Thr Ser Leu Ser Ile Phe Tyr Leu Leu Lys Ile Ala Asn
            100                 105                 110 ttc tcc aac ctt att ttt ctt cac tta aag agg aga gtt aag agt gtt      384
Phe Ser Asn Leu Ile Phe Leu His Leu Lys Arg Arg Val Lys Ser Val
        115                 120                 125 gtt ctg gtg ata cta ttg ggg cct ttg cta ttt ttg gtt tgt cat ctt      432
Val Leu Val Ile Leu Leu Gly Pro Leu Leu Phe Leu Val Cys His Leu
    130                 135                 140 ttt gtg ata aac atg aat cag att ata tgg aca aaa gaa tat gaa gga      480
Phe Val Ile Asn Met Asn Gln Ile Ile Trp Thr Lys Glu Tyr Glu Gly
145                 150                 155                 160 aac atg act tgg aag atc aaa ctg agg agt gca atg tac ctt tca aat      528
Asn Met Thr Trp Lys Ile Lys Leu Arg Ser Ala Met Tyr Leu Ser Asn
                165                 170                 175 aca acg gta acc atc cta gca aac tta gtt ccc ttc act ctg acc ctg      576
Thr Thr Val Thr Ile Leu Ala Asn Leu Val Pro Phe Thr Leu Thr Leu
            180                 185                 190 ata tct ttt ctg ctg tta atc tgt tct ctg tgt aaa cat ctc aaa aag      624
Ile Ser Phe Leu Leu Leu Ile Cys Ser Leu Cys Lys His Leu Lys Lys
        195                 200                 205
```

| | | | | | | | | | | | | | | | | |
|---|---|---|---|---|---|---|---|---|---|---|---|---|---|---|---|---|
| atg | cag | ctc | cat | ggc | aaa | gga | tct | caa | gat | ccc | agc | atg | aag | gtc | cac | 672 |
| Met | Gln | Leu | His | Gly | Lys | Gly | Ser | Gln | Asp | Pro | Ser | Met | Lys | Val | His | |
| | 210 | | | | | 215 | | | | | 220 | | | | | |
| ata | aaa | gct | ttg | caa | act | gtg | acc | tcc | ttc | ctc | ttg | tta | tgt | gcc | att | 720 |
| Ile | Lys | Ala | Leu | Gln | Thr | Val | Thr | Ser | Phe | Leu | Leu | Leu | Cys | Ala | Ile | |
| 225 | | | | | 230 | | | | | 235 | | | | | 240 | |
| tac | ttt | ctg | tcc | ata | atc | atg | tca | gtt | tgg | agt | ttt | gag | agt | ctg | gaa | 768 |
| Tyr | Phe | Leu | Ser | Ile | Ile | Met | Ser | Val | Trp | Ser | Phe | Glu | Ser | Leu | Glu | |
| | | | | 245 | | | | | 250 | | | | | 255 | | |
| aac | aaa | cct | gtc | ttc | atg | ttc | tgc | gaa | gct | att | gca | ttc | agc | tat | cct | 816 |
| Asn | Lys | Pro | Val | Phe | Met | Phe | Cys | Glu | Ala | Ile | Ala | Phe | Ser | Tyr | Pro | |
| | | | 260 | | | | | 265 | | | | | 270 | | | |
| tca | acc | cac | cca | ttc | atc | ctg | att | tgg | gga | aac | aag | aag | cta | aag | cag | 864 |
| Ser | Thr | His | Pro | Phe | Ile | Leu | Ile | Trp | Gly | Asn | Lys | Lys | Leu | Lys | Gln | |
| | | 275 | | | | | 280 | | | | | 285 | | | | |
| act | ttt | ctt | tca | gtt | ttg | tgg | cat | gtg | agg | tac | tgg | gtg | aaa | gga | gag | 912 |
| Thr | Phe | Leu | Ser | Val | Leu | Trp | His | Val | Arg | Tyr | Trp | Val | Lys | Gly | Glu | |
| 290 | | | | | 295 | | | | | 300 | | | | | | |
| aag | cct | tca | tct | tca | tag | | | | | | | | | | | 930 |
| Lys | Pro | Ser | Ser | Ser | | | | | | | | | | | | |
| 305 | | | | | | | | | | | | | | | | |

<210> SEQ ID NO 8
<211> LENGTH: 309
<212> TYPE: PRT
<213> ORGANISM: Homo sapiens

<400> SEQUENCE: 8

Met Ile Thr Phe Leu Pro Ile Ile Phe Ser Ile Leu Ile Val Val Thr
1               5                   10                  15

Phe Val Ile Gly Asn Phe Ala Asn Gly Phe Ile Ala Leu Val Asn Ser
                20                  25                  30

Ile Glu Trp Phe Lys Arg Gln Lys Ile Ser Phe Ala Asp Gln Ile Leu
            35                  40                  45

Thr Ala Leu Ala Val Ser Arg Val Gly Leu Leu Trp Val Leu Val Leu
    50                  55                  60

Asn Trp Tyr Ala Thr Glu Leu Asn Pro Ala Phe Asn Ser Ile Glu Val
65                  70                  75                  80

Arg Ile Thr Ala Tyr Asn Val Trp Ala Val Ile Asn His Phe Ser Asn
                85                  90                  95

Trp Leu Ala Thr Ser Leu Ser Ile Phe Tyr Leu Leu Lys Ile Ala Asn
            100                 105                 110

Phe Ser Asn Leu Ile Phe Leu His Leu Lys Arg Arg Val Lys Ser Val
        115                 120                 125

Val Leu Val Ile Leu Leu Gly Pro Leu Leu Phe Val Cys His Leu
    130                 135                 140

Phe Val Ile Asn Met Asn Gln Ile Ile Trp Thr Lys Glu Tyr Glu Gly
145                 150                 155                 160

Asn Met Thr Trp Lys Ile Lys Leu Arg Ser Ala Met Tyr Leu Ser Asn
                165                 170                 175

Thr Thr Val Thr Ile Leu Ala Asn Leu Val Pro Phe Thr Leu Thr Leu
            180                 185                 190

Ile Ser Phe Leu Leu Leu Ile Cys Ser Leu Cys Lys His Leu Lys Lys
        195                 200                 205

Met Gln Leu His Gly Lys Gly Ser Gln Asp Pro Ser Met Lys Val His
    210                 215                 220

Ile Lys Ala Leu Gln Thr Val Thr Ser Phe Leu Leu Leu Cys Ala Ile

```
                225                 230                 235                 240
Tyr Phe Leu Ser Ile Ile Met Ser Val Trp Ser Phe Glu Ser Leu Glu
                245                 250                 255

Asn Lys Pro Val Phe Met Phe Cys Glu Ala Ile Ala Phe Ser Tyr Pro
            260                 265                 270

Ser Thr His Pro Phe Ile Leu Ile Trp Gly Asn Lys Lys Leu Lys Gln
        275                 280                 285

Thr Phe Leu Ser Val Leu Trp His Val Arg Tyr Trp Val Lys Gly Glu
    290                 295                 300

Lys Pro Ser Ser Ser
305

<210> SEQ ID NO 9
<211> LENGTH: 876
<212> TYPE: DNA
<213> ORGANISM: Homo sapiens
<220> FEATURE:
<221> NAME/KEY: CDS
<222> LOCATION: (1)..(876)

<400> SEQUENCE: 9 atg ata ccc atc caa ctc act gtc ttc ttc atg atc atc tat gtg ctt      48
Met Ile Pro Ile Gln Leu Thr Val Phe Phe Met Ile Ile Tyr Val Leu
1               5                   10                  15 gag tcc ttg aca att att gtg cag agc agc cta att gtt gca gtg ctg      96
Glu Ser Leu Thr Ile Ile Val Gln Ser Ser Leu Ile Val Ala Val Leu
            20                  25                  30 ggc aga gaa tgg ctg caa gtc aga agg ctg atg cct gtg gac atg att     144
Gly Arg Glu Trp Leu Gln Val Arg Arg Leu Met Pro Val Asp Met Ile
        35                  40                  45 ctc atc agc ctg ggc atc tct cgc ttc tgt cta cag tgg gca tca atg     192
Leu Ile Ser Leu Gly Ile Ser Arg Phe Cys Leu Gln Trp Ala Ser Met
    50                  55                  60 ctg aac aat ttt tgc tcc tat ttt aat ttg aat tat gta ctt tgc aac     240
Leu Asn Asn Phe Cys Ser Tyr Phe Asn Leu Asn Tyr Val Leu Cys Asn
65                  70                  75                  80 tta aca atc acc tgg gaa ttt ttt aat atc ctt aca ttc tgg tta aac     288
Leu Thr Ile Thr Trp Glu Phe Phe Asn Ile Leu Thr Phe Trp Leu Asn
                85                  90                  95 agc ttg ctt acc gtg ttc tac tgc atc aag gtc tct tct ttc acc cat     336
Ser Leu Leu Thr Val Phe Tyr Cys Ile Lys Val Ser Ser Phe Thr His
            100                 105                 110 cac atc ttt ctc tgg ctg agg tgg aga att ttg agg ttg ttt ccc tgg     384
His Ile Phe Leu Trp Leu Arg Trp Arg Ile Leu Arg Leu Phe Pro Trp
        115                 120                 125 ata tta ctg ggt tct ctg atg att act tgt gta aca atc atc cct tca     432
Ile Leu Leu Gly Ser Leu Met Ile Thr Cys Val Thr Ile Ile Pro Ser
    130                 135                 140 gct att ggg aat tac att caa att cag tta ctc acc atg gag cat cta     480
Ala Ile Gly Asn Tyr Ile Gln Ile Gln Leu Leu Thr Met Glu His Leu
145                 150                 155                 160 cca aga aac agc act gta act gac aaa ctt gaa aat ttt cat cag tat     528
Pro Arg Asn Ser Thr Val Thr Asp Lys Leu Glu Asn Phe His Gln Tyr
                165                 170                 175 cag ttc cag gct cat aca gtt gca ttg gtt att cct ttc atc ctg ttc     576
Gln Phe Gln Ala His Thr Val Ala Leu Val Ile Pro Phe Ile Leu Phe
            180                 185                 190 ctg gcc tcc acc atc ttt ctc atg gca tca ctg acc aag cag ata caa     624
Leu Ala Ser Thr Ile Phe Leu Met Ala Ser Leu Thr Lys Gln Ile Gln
        195                 200                 205
```

```
cat cat agc act ggt cac tgc aat cca agc atg aaa gcg cgc ttc act      672
His His Ser Thr Gly His Cys Asn Pro Ser Met Lys Ala Arg Phe Thr
    210                 215                 220 gcc ctg agg tcc ctt gcc gtc tta ttt att gtg ttt acc tct tac ttt      720
Ala Leu Arg Ser Leu Ala Val Leu Phe Ile Val Phe Thr Ser Tyr Phe
225                 230                 235                 240 cta acc ata ctc atc acc att ata ggt act cta ttt gat aag aga tgt     768
Leu Thr Ile Leu Ile Thr Ile Ile Gly Thr Leu Phe Asp Lys Arg Cys
                245                 250                 255 tgg tta tgg gtc tgg gaa gct ttt gtc tat gct ttc atc tta atg cat     816
Trp Leu Trp Val Trp Glu Ala Phe Val Tyr Ala Phe Ile Leu Met His
                260                 265                 270 tcc act tca ctg atg ctg agc agc cct acg ttg aaa agg att cta aag     864
Ser Thr Ser Leu Met Leu Ser Ser Pro Thr Leu Lys Arg Ile Leu Lys
        275                 280                 285 gga aag tgc tag                                                      876
Gly Lys Cys
290

<210> SEQ ID NO 10
<211> LENGTH: 291
<212> TYPE: PRT
<213> ORGANISM: Homo sapiens

<400> SEQUENCE: 10

Met Ile Pro Ile Gln Leu Thr Val Phe Phe Met Ile Ile Tyr Val Leu
1               5                   10                  15

Glu Ser Leu Thr Ile Ile Val Gln Ser Ser Leu Ile Val Ala Val Leu
            20                  25                  30

Gly Arg Glu Trp Leu Gln Val Arg Arg Leu Met Pro Val Asp Met Ile
        35                  40                  45

Leu Ile Ser Leu Gly Ile Ser Arg Phe Cys Leu Gln Trp Ala Ser Met
    50                  55                  60

Leu Asn Asn Phe Cys Ser Tyr Phe Asn Leu Asn Tyr Val Leu Cys Asn
65              70                  75                  80

Leu Thr Ile Thr Trp Glu Phe Phe Asn Ile Leu Thr Phe Trp Leu Asn
            85                  90                  95

Ser Leu Leu Thr Val Phe Tyr Cys Ile Lys Val Ser Ser Phe Thr His
            100                 105                 110

His Ile Phe Leu Trp Leu Arg Trp Arg Ile Leu Arg Leu Phe Pro Trp
        115                 120                 125

Ile Leu Leu Gly Ser Leu Met Ile Thr Cys Val Thr Ile Ile Pro Ser
    130                 135                 140

Ala Ile Gly Asn Tyr Ile Gln Ile Gln Leu Leu Thr Met Glu His Leu
145                 150                 155                 160

Pro Arg Asn Ser Thr Val Thr Asp Lys Leu Glu Asn Phe His Gln Tyr
                165                 170                 175

Gln Phe Gln Ala His Thr Val Ala Leu Val Ile Pro Phe Ile Leu Phe
            180                 185                 190

Leu Ala Ser Thr Ile Phe Leu Met Ala Ser Leu Thr Lys Gln Ile Gln
        195                 200                 205

His His Ser Thr Gly His Cys Asn Pro Ser Met Lys Ala Arg Phe Thr
    210                 215                 220

Ala Leu Arg Ser Leu Ala Val Leu Phe Ile Val Phe Thr Ser Tyr Phe
225                 230                 235                 240

Leu Thr Ile Leu Ile Thr Ile Ile Gly Thr Leu Phe Asp Lys Arg Cys
                245                 250                 255
```

```
Trp Leu Trp Val Trp Glu Ala Phe Val Tyr Ala Phe Ile Leu Met His
            260                 265                 270
Ser Thr Ser Leu Met Leu Ser Ser Pro Thr Leu Lys Arg Ile Leu Lys
        275                 280                 285
Gly Lys Cys
    290

<210> SEQ ID NO 11
<211> LENGTH: 144
<212> TYPE: DNA
<213> ORGANISM: rat

<400> SEQUENCE: 11
atggccgctg ttacctatcc ttcatccgtg cctacgacct tggaccctgg gaatgcatcc       60
tcagcctggc ccctggacac gtccctgggg aatgcatctg ctggcactag cctggcagga      120
ctggctgtca gtggcgaatt catg                                             144

<210> SEQ ID NO 12
<211> LENGTH: 45
<212> TYPE: DNA
<213> ORGANISM: herpes simplex virus

<400> SEQUENCE: 12
tgcggccgcc agcctgaact cgctcctgaa gacccggaag attaa                       45

<210> SEQ ID NO 13
<211> LENGTH: 1113
<212> TYPE: DNA
<213> ORGANISM: artificial construct
<220> FEATURE:
<223> OTHER INFORMATION: construct includes human TASR44 receptor coding
      sequence in the following order: RSS Tag::hTAS2R16::HSV Tag
<220> FEATURE:
<221> NAME/KEY: CDS
<222> LOCATION: (1)..(1113)

<400> SEQUENCE: 13 atg gcc gct gtt acc tat cct tca tcc gtg cct acg acc ttg gac cct        48
Met Ala Ala Val Thr Tyr Pro Ser Ser Val Pro Thr Thr Leu Asp Pro
1               5                   10                  15 ggg aat gca tcc tca gcc tgg ccc ctg gac acg tcc ctg ggg aat gca        96
Gly Asn Ala Ser Ser Ala Trp Pro Leu Asp Thr Ser Leu Gly Asn Ala
            20                  25                  30 tct gct ggc act agc ctg gca gga ctg gct gtc agt ggc gaa ttc atg       144
Ser Ala Gly Thr Ser Leu Ala Gly Leu Ala Val Ser Gly Glu Phe Met
        35                  40                  45 aca act ttt ata ccc atc att ttt tcc agt gtg gta gtg gtt cta ttt       192
Thr Thr Phe Ile Pro Ile Ile Phe Ser Ser Val Val Val Val Leu Phe
    50                  55                  60 gtt att gga aat ttt gct aat ggc ttc ata gca ttg gta aat tcc att       240
Val Ile Gly Asn Phe Ala Asn Gly Phe Ile Ala Leu Val Asn Ser Ile
65                  70                  75                  80 gag cgg gtc aag aga caa aag atc tct ttt gct gac cag att ctc act       288
Glu Arg Val Lys Arg Gln Lys Ile Ser Phe Ala Asp Gln Ile Leu Thr
                85                  90                  95 gct ctg gcg gtc tcc aga gtt ggt ttg ctc tgg gta tta tta tta aat       336
Ala Leu Ala Val Ser Arg Val Gly Leu Leu Trp Val Leu Leu Leu Asn
            100                 105                 110 tgg tat tca act gtg ttt aat cca gct ttt tat agt gta gaa gta aga       384
Trp Tyr Ser Thr Val Phe Asn Pro Ala Phe Tyr Ser Val Glu Val Arg
        115                 120                 125 act act gct tat aat gtc tgg gca gta acc ggc cat ttc agc aac tgg       432
```

```
Thr Thr Ala Tyr Asn Val Trp Ala Val Thr Gly His Phe Ser Asn Trp
    130                 135                 140 ctt gct act agc ctc agc ata ttt tat ttg ctc aag att gcc aat ttc       480
Leu Ala Thr Ser Leu Ser Ile Phe Tyr Leu Leu Lys Ile Ala Asn Phe
145                 150                 155                 160 tcc aac ctt att ttt ctt cac tta aag agg aga gtt aag agt gtc att       528
Ser Asn Leu Ile Phe Leu His Leu Lys Arg Arg Val Lys Ser Val Ile
                165                 170                 175 ctg gtg atg ctg ttg ggg cct tta cta ttt ttg gct tgt caa ctt ttt       576
Leu Val Met Leu Leu Gly Pro Leu Leu Phe Leu Ala Cys Gln Leu Phe
            180                 185                 190 gtg ata aac atg aaa gag att gta cgg aca aaa gaa tat gaa gga aac       624
Val Ile Asn Met Lys Glu Ile Val Arg Thr Lys Glu Tyr Glu Gly Asn
        195                 200                 205 atg act tgg aag atc aaa ttg agg agt gca gtg tac ctt tca gat gcg       672
Met Thr Trp Lys Ile Lys Leu Arg Ser Ala Val Tyr Leu Ser Asp Ala
210                 215                 220 act gta acc acg cta gga aac tta gtg ccc ttc act ctg acc ctg cta       720
Thr Val Thr Thr Leu Gly Asn Leu Val Pro Phe Thr Leu Thr Leu Leu
225                 230                 235                 240 tgt ttt ttg ctg tta atc tgt tct ctg tgt aaa cat ctc aag aag atg       768
Cys Phe Leu Leu Leu Ile Cys Ser Leu Cys Lys His Leu Lys Lys Met
                245                 250                 255 cag ctc cat ggt aaa gga tct caa gat ccc agc acc aag gtc cac ata       816
Gln Leu His Gly Lys Gly Ser Gln Asp Pro Ser Thr Lys Val His Ile
            260                 265                 270 aaa gct ttg caa act gtg atc ttt ttc ctc ttg tta tgt gcc gtt tac       864
Lys Ala Leu Gln Thr Val Ile Phe Phe Leu Leu Leu Cys Ala Val Tyr
        275                 280                 285 ttt ctg tcc ata atg ata tca gtt tgg agt ttt ggg agt ctg gaa aac       912
Phe Leu Ser Ile Met Ile Ser Val Trp Ser Phe Gly Ser Leu Glu Asn
290                 295                 300 aaa cct gtc ttc atg ttc tgc aaa gct att aga ttc agc tat cct tca       960
Lys Pro Val Phe Met Phe Cys Lys Ala Ile Arg Phe Ser Tyr Pro Ser
305                 310                 315                 320 atc cac cca ttc atc ctg att tgg gga aac aag aag cta aag cag act      1008
Ile His Pro Phe Ile Leu Ile Trp Gly Asn Lys Lys Leu Lys Gln Thr
                325                 330                 335 ttt ctt tca gtt ttg cgg caa gtg agg tac tgg gtg aaa gga gag aag      1056
Phe Leu Ser Val Leu Arg Gln Val Arg Tyr Trp Val Lys Gly Glu Lys
            340                 345                 350 cct tca tct cca tgc ggc cgc cag cct gaa ctc gct cct gaa gac ccg      1104
Pro Ser Ser Pro Cys Gly Arg Gln Pro Glu Leu Ala Pro Glu Asp Pro
        355                 360                 365 gaa gat taa                                                          1113
Glu Asp
    370

<210> SEQ ID NO 14
<211> LENGTH: 370
<212> TYPE: PRT
<213> ORGANISM: artificial construct
<220> FEATURE:
<223> OTHER INFORMATION: Synthetic Construct

<400> SEQUENCE: 14

Met Ala Ala Val Thr Tyr Pro Ser Ser Val Pro Thr Thr Leu Asp Pro
1               5                   10                  15

Gly Asn Ala Ser Ser Ala Trp Pro Leu Asp Thr Ser Leu Gly Asn Ala
            20                  25                  30

Ser Ala Gly Thr Ser Leu Ala Gly Leu Ala Val Ser Gly Glu Phe Met
```

```
                35                  40                  45
Thr Thr Phe Ile Pro Ile Ile Phe Ser Ser Val Val Val Leu Phe
    50                  55                  60

Val Ile Gly Asn Phe Ala Asn Gly Phe Ile Ala Leu Val Asn Ser Ile
65                  70                  75                  80

Glu Arg Val Lys Arg Gln Lys Ile Ser Phe Ala Asp Gln Ile Leu Thr
                85                  90                  95

Ala Leu Ala Val Ser Arg Val Gly Leu Leu Trp Val Leu Leu Asn
                100                 105                 110

Trp Tyr Ser Thr Val Phe Asn Pro Ala Phe Tyr Ser Val Glu Val Arg
                115                 120                 125

Thr Thr Ala Tyr Asn Val Trp Ala Val Thr Gly His Phe Ser Asn Trp
        130                 135                 140

Leu Ala Thr Ser Leu Ser Ile Phe Tyr Leu Leu Lys Ile Ala Asn Phe
145                 150                 155                 160

Ser Asn Leu Ile Phe Leu His Leu Lys Arg Arg Val Lys Ser Val Ile
                165                 170                 175

Leu Val Met Leu Leu Gly Pro Leu Leu Phe Leu Ala Cys Gln Leu Phe
            180                 185                 190

Val Ile Asn Met Lys Glu Ile Val Arg Thr Lys Glu Tyr Glu Gly Asn
            195                 200                 205

Met Thr Trp Lys Ile Lys Leu Arg Ser Ala Val Tyr Leu Ser Asp Ala
    210                 215                 220

Thr Val Thr Thr Leu Gly Asn Leu Val Pro Phe Thr Leu Thr Leu Leu
225                 230                 235                 240

Cys Phe Leu Leu Leu Ile Cys Ser Leu Cys Lys His Leu Lys Lys Met
                245                 250                 255

Gln Leu His Gly Lys Gly Ser Gln Asp Pro Ser Thr Lys Val His Ile
                260                 265                 270

Lys Ala Leu Gln Thr Val Ile Phe Phe Leu Leu Leu Cys Ala Val Tyr
    275                 280                 285

Phe Leu Ser Ile Met Ile Ser Val Trp Ser Phe Gly Ser Leu Glu Asn
    290                 295                 300

Lys Pro Val Phe Met Phe Cys Lys Ala Ile Arg Phe Ser Tyr Pro Ser
305                 310                 315                 320

Ile His Pro Phe Ile Leu Ile Trp Gly Asn Lys Lys Leu Lys Gln Thr
                325                 330                 335

Phe Leu Ser Val Leu Arg Gln Val Arg Tyr Trp Val Lys Gly Glu Lys
                340                 345                 350

Pro Ser Ser Pro Cys Gly Arg Gln Pro Glu Leu Ala Pro Glu Asp Pro
            355                 360                 365

Glu Asp
    370
```